United States Patent
Fahrny et al.

(10) Patent No.: US 11,831,659 B2
(45) Date of Patent: *Nov. 28, 2023

(54) SECURITY MONITORING AT OPERATING SYSTEM KERNEL LEVEL

(71) Applicant: Comcast Cable Communications, LLC, Philadelphia, PA (US)

(72) Inventors: James Fahrny, Parker, CO (US); Kyong Park, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 594 days.

This patent is subject to a terminal disclaimer.

(21) Appl. No.: 16/991,592

(22) Filed: Aug. 12, 2020

(65) Prior Publication Data

US 2021/0067526 A1 Mar. 4, 2021

Related U.S. Application Data

(63) Continuation of application No. 15/047,138, filed on Feb. 18, 2016, now Pat. No. 10,771,478.

(51) Int. Cl.
*H04L 9/40* (2022.01)
*G06F 21/55* (2013.01)
(Continued)

(52) U.S. Cl.
CPC .......... *H04L 63/1416* (2013.01); *G06F 21/53* (2013.01); *G06F 21/54* (2013.01);
(Continued)

(58) Field of Classification Search
None
See application file for complete search history.

(56) References Cited

U.S. PATENT DOCUMENTS 7,113,995 B1 9/2006 Beukema et al.
7,120,763 B1 10/2006 Schafer
(Continued)

FOREIGN PATENT DOCUMENTS

JP 2012083922 A 4/2012
WO 2007132392 A2 11/2007

OTHER PUBLICATIONS

Dec. 4, 2001—OpenCable Application Platform Specification—Cable Television Laboratories.
(Continued)

*Primary Examiner* — Joseph P Hirl
*Assistant Examiner* — Hassan Saadoun
(74) *Attorney, Agent, or Firm* — Banner & Witcoff, Ltd.

(57) ABSTRACT

Methods and apparatus for real-time security monitoring on a computing device are presented. A system may define privileges to access hardware interfaces for each process of a plurality of processes executing on a computing device. The privileges may be defined in a privileged operating system level that controls root access to an operating system. In response to a determination that a process is attempting to access a hardware interface, the system may determine whether the process is privileged to access the hardware interface by checking the privileges. In response to determining that the process is not privileged to access the hardware interface, the intrusion detection agent may terminate the process.

57 Claims, 9 Drawing Sheets

(51) Int. Cl.
   *G06F 21/64*   (2013.01)
   *G06F 21/53*   (2013.01)
   *G06F 21/54*   (2013.01)
   *G06F 21/57*   (2013.01)
   *H04L 9/32*    (2006.01)
   *H04W 12/06*   (2021.01)

(52) U.S. Cl.
   CPC .......... *G06F 21/552* (2013.01); *G06F 21/554* (2013.01); *G06F 21/57* (2013.01); *G06F 21/64* (2013.01); *H04L 9/3239* (2013.01); *H04L 63/0823* (2013.01); *H04L 63/101* (2013.01); *H04W 12/06* (2013.01); *G06F 2221/2141* (2013.01); *H04L 63/126* (2013.01)

(56) References Cited

U.S. PATENT DOCUMENTS

| | | | |
|---|---|---|---|
| 10,417,399 B2* | 9/2019 | Wajs | ............ H04L 9/3226 |
| 2003/0051169 A1* | 3/2003 | Sprigg | ............ G06F 9/468 |
| | | | 713/185 |
| 2003/0172296 A1* | 9/2003 | Gunter | ............ H04L 67/02 |
| | | | 713/156 |
| 2004/0003277 A1 | 1/2004 | Rabeler | |
| 2005/0198489 A1 | 9/2005 | Wallace et al. | |
| 2007/0079090 A1 | 4/2007 | Rajagopal et al. | |
| 2008/0295174 A1 | 11/2008 | Fahmy et al. | |
| 2014/0205099 A1 | 7/2014 | Christodorescu et al. | |
| 2016/0124865 A1 | 5/2016 | Junghans et al. | |
| 2017/0230336 A1* | 8/2017 | Bingham | ............ H04L 63/1491 |
| 2018/0336361 A1* | 11/2018 | Gilani | ............ G06Q 30/018 |
| 2021/0397709 A1* | 12/2021 | Ndu | ............ G06F 21/57 |

OTHER PUBLICATIONS

May 2000—The DVB-Multimedia Home Platform, API for Interactive Digital TV Applications—Philips Forschungslaboratorien.
Jun. 23, 2017—European Search Report—EP 17156758.9.
Jun. 1, 2018—European Office Action—EP 17156758.9.

* cited by examiner

SECURITY MONITORING AT OPERATING SYSTEM KERNEL LEVEL

CROSS-REFERENCE TO RELATED APPLICATIONS

This application claims priority to and is a continuation of U.S. application Ser. No. 15/047,138, filed on Feb. 18, 2016, the contents of which are incorporated herein by reference in its entirety.

BACKGROUND

With the proliferation of Internet connected devices and cloud computing, device security has become a major challenge. With such proliferation of Internet connected devices, more and more users conduct various types of business transactions and access sensitive data on such devices. With various malicious agents attempting to breach user devices, there remains an ever-present need to improve security monitoring of user devices to prevent such security breaches. Security breaches are often undetected for long periods of time after the breach has occurred.

SUMMARY

The following summary is for illustrative purposes only, and is not intended to limit or constrain the detailed description.

In some aspects of the disclosure, an intrusion detection agent may determine whether a process that is attempting to access a host interface, such as a hardware interface or a software interface, has sufficient privileges to access the interface. In response to determining that the process does not have privileges to access the interface, the process may be terminated by the intrusion detection agent. In some embodiments, the intrusion detection agent may be assigned a more privileged level than an administrative user in various operating systems.

In some embodiments, a computing device in communication with a user device may determine that the user device has initiated execution of a process. The computing device may transmit a cryptographic hash function corresponding to the process and instruct the user device to execute the cryptographic hash function to authenticate the process. In some aspects, the computing device may communicate with an intrusion detection agent executing on the user device in order to cause execution of the cryptographic hash function on the user device.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

Figure 1:
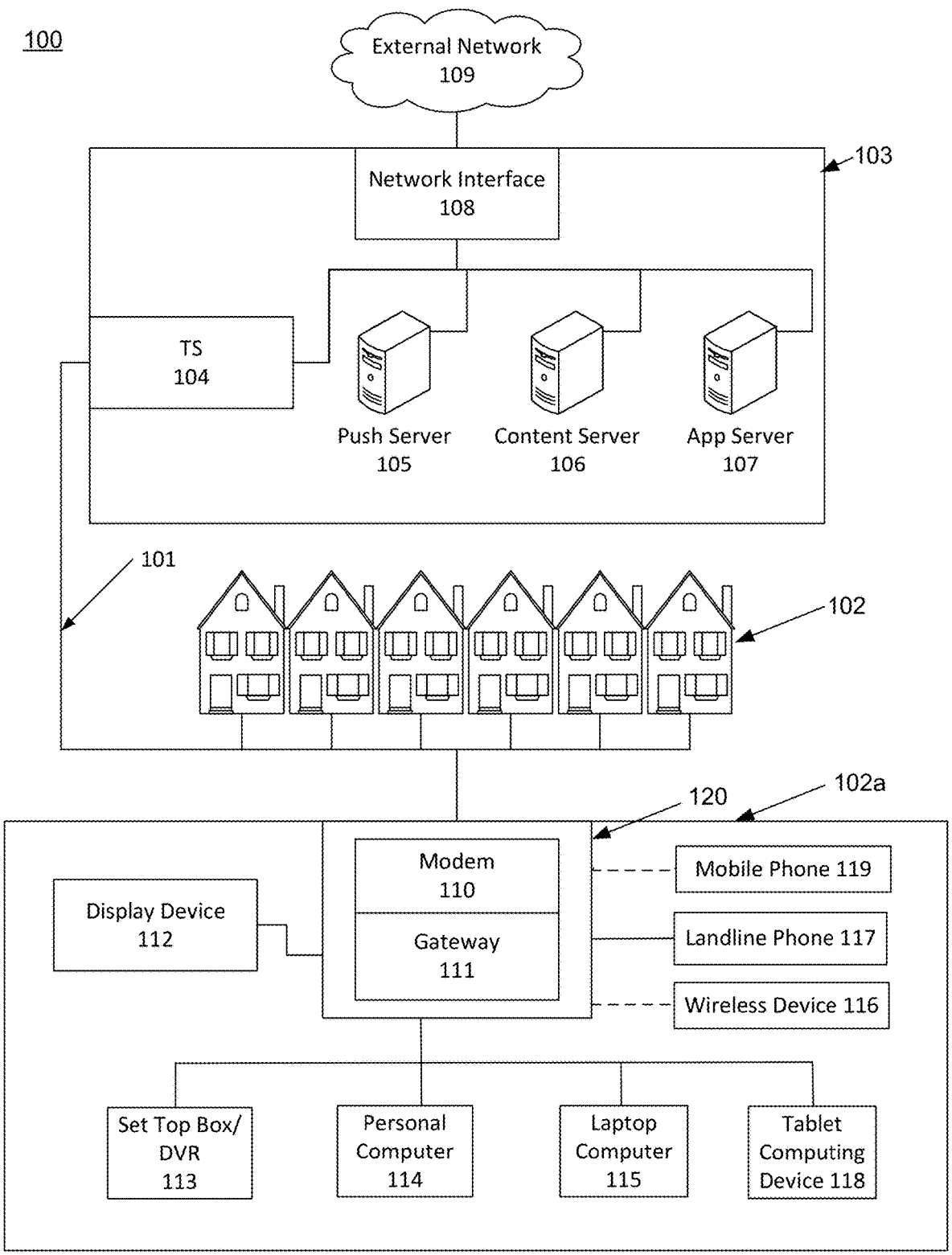
FIG. 1 shows an example communication network on which various features described herein may be used.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

The present disclosure describes several features of an intrusion detection agent implemented on a user computing device. The intrusion detection agent may secure the computing device by preventing malicious users from taking control of the computing device to perform undesired processes using the computing device's resources. The intrusion detection agent may be an operating system kernel component implemented at a super root level of the computing device's operating system that is inaccessible to other processes, including those that may have administrative access to the root level of the computing device's operating system. As referred to hereinafter, the intrusion detection agent may refer to the computing device executing instructions to perform the actions attributed to the intrusion detection agent.

In traditional Linux or other Unix-like operating systems, a root level is an operating system level that by default has access to all commands and files executing on the operating system. The root level may also be referred to as the root account, root user and the superuser. A root user may be able to control operating system kernels. A kernel is a computer program that may manage input/output requests from software applications and processes for the central processing unit and other electronic components of a computer. The code for such operating kernels may be loaded into a protected area of memory, hereinafter referred to as a kernel space, to prevent operating system kernels from being overwritten by applications. The kernel may perform its tasks, such as executing processes and handling software interrupts, in the kernel space, whereas user initiated actions, such as GUI interactions and writing text, may be performed in a less restrictive user space. Software application requests that are issued to an operating system kernel may be hereinafter referred to as a system call.

In traditional operating systems, the root account may be the most privileged account on the system and may exert absolute power over the operating system (e.g., complete access to all files and commands). The root account may be privileged with the ability to modify the operating system in any way desired and to grant and revoke access permissions (e.g., the ability to read, modify and execute specific files and directories) for other users, including any of those that are by default reserved for the root account. By contrast, a standard user account may have restricted access to several features of the operating system. The permissions in operating systems may be set by default to prevent ordinary user accounts from accessing critical parts of the system, files, and directories belonging to other users. However, root level access in traditional operating systems may have the potential to modify any of the operating system's functions and may have the potential to damage the operating system. In traditional operating systems, certain users may gain access to the kernel space of an operating system and be able to control operating system kernels. Such a practice is known as 'rooting.' 'Rooting' or gaining root level access to the operating system of a user device may allow a root user to alter and/or replace system applications and settings, run specialized applications that require administrator-level permissions, and/or perform other operations that are otherwise inaccessible to standard user. 'Rooting' may allow a root level user to execute privilege commands on user-installed applications, which may be otherwise unavailable with user level access to the operating system, for modifying and/or deleting system files, and/or removing or manufacturer-installed applications.

According to the present disclosure, such a traditional operating system may be modified to restrict the level of access a root account may have on the operating system and introduce a super root account or super root user, which may have unrestricted access to the operating system. However, the super root level access to the operating system may be inaccessible to users, either standard user or root level users. Whereas, in traditional operating systems, root level access may have been granted to root users, who may then be able to exert complete command over the operating system, super root level access to the modified operating system may not be granted to any user or any entity. The super root level of the operating system may exist as a space on which highly privileged kernels such as the intrusion detection agent may execute without being able to be accessed by any processes. The super root level, on which the intrusion detection agent operates, may be a more privileged level than the root level of the computing device's operating system. By operating at the super root level of the computing device's operating system, the intrusion detection agent may be able to monitor the security of the computing device without being subject to modification or access by external malicious users. The intrusion detection agent, operating at the super root level, may also restrict the root users from accessing a command shell and issuing commands to the computing device's operating system through a command-line interface. Additionally or alternatively, the intrusion detection agent may prevent a root user and/or a root process from accessing and executing system calls that allow one process to control another process executing on the operating system of the computing device such as the "ptrace" function in Unix and Unix-like operating systems.

Additionally or alternatively, the intrusion detection agent may monitor access by a requesting process to such system calls that allow control of a different process (e.g., ptrace function) and may grant access to such system calls to a requesting process upon verifying whether the requesting process has the authorization to control a specified process on a particular interface of the computing device.

The intrusion detection agent may monitor system resources and applications executing on the user device, manage system calls, and prevent unauthorized applications from accessing system resources. For example, in some embodiments, the intrusion detection agent may restrict a requesting process from executing, from spawning child processes and/or from performing inter-process communication. In some embodiments, the intrusion detection agent may restrict access by a requesting process to system resources, such as communications stacks, file systems and/or other stored data. In some embodiments, when access is granted, the intrusion detection agent may restrict the nature of the access, for example, enabling read operations to a file system while restricting write operations. In some embodiments, the intrusion detection agent may monitor processes for events and/or errors. For example, the intrusion detection agent may monitor a process exercising its privileges and look for security events such as logins, application events such as externally-driven network requests accessing interfaces or for errors such as an inability to communicate with a security analytics server. Those skilled in the art will recognize that various security controls may be implemented according to the methods described herein, including controls with various combinations of privilege enforcement and monitoring, among processes having various levels of privilege (e.g. super root, root or other).

While access to the super root level of the operating system may not be granted to any entity, kernel agents with super root access to the operating system may communicate monitored information to servers located remotely from the user device. For example, the intrusion detection agent may communicate security logs accumulated by monitoring each of the user device components to a remote server. For example, the intrusion detection agent may report events, such as those noted above, to a security operations center. In some embodiments, various types of events may be reported, including process events such as privilege wielding, security events such as logins, and application events such as the establishment of a video session. In some embodiments, the computing device may continuously monitor all processes implemented on the computing device by executing the intrusion detection agent on the super root level of the operating system. In particular, the computing device may monitor which interfaces and resources each process implementing on the computing device is accessing and attempting to access. The intrusion detection agent may define and set privileges in the computing device's hardware itself that specify which processes are allowed access to a given interface or component of the computing device. When any process attempts to access a host interface, the computing device may determine whether that process has the privilege to access that host interface. If privileged access is allowed, the computing device may allow the requesting process access to the interface. Otherwise, the computing device may prevent the process from accessing the interface. By monitoring each process implemented on the computing device and each host interface and/or component that each process is attempting to access, the computing device, under the intrusion detection agent's control, may prevent any process, the product of a malicious attacker, from accessing any host interface of the computing device. As a result, the computing device may prevent a malicious process from controlling any part of the computing device and accordingly ensure prevention of security breaches of the computing device. In various embodiments, the host interface may be implemented using hardware and/or software components. "Host interface," "hardware interface," and "software interface" may be used interchangeably in the disclosure herein.

In some embodiments, the computing device may control root access into a kernel of the computing device's operating system. For example, the intrusion detection agent may establish and/or manage a secure login process for a user and/or process to gain root level access to the operating system. The intrusion detection agent may also set privileges for each application executing on the computing device to allowing or prohibit access to an operating system kernel with root level access privileges. The intrusion detection agent may set access privileges for each application and/or each application process to determine whether an application may access certain memory regions, make calls to device drivers, access certain hardware interfaces, or have access to certain kernel level operating system calls. The intrusion detection agent may set privileges governing which application processes and which users are allowed root level access to the operating system of the user device. Root level access to the modified operating system may be reserved for administrative purposes. However, access to the root level of the operation system may not comprise unrestricted access to the user device's hardware interfaces and the ability to make any and all system calls to the operating system's software components. Instead, the intrusion detection agent may set privileges on specific hardware interfaces and/or software resources such that some of them may not be modified in specific ways, including by a root level user. For example, the intrusion detection agent may set a privilege to prevent any root level process from changing BIOS settings. However, the intrusion detect agent may permit specific input/output ports to be read and/or written to by processes with root level access to the operating system. In order to be able to modify such hardware interfaces, the root level user may be required to pass authentication and other security verification. Additionally or alternatively, the intrusion detection agent may control which processes' execution may occur. The intrusion detection agent may determine which file system reads and writes are allowed. In setting privileges for each application, the intrusion detection agent may set the ability to create a shell as a privilege for each application, so that malicious processes' attempts to hijack an application to execute shell scripts may be controlled.

Malicious attackers often attempt to hijack control of a set top box (STB) to force the STB to display certain messages or transmit certain information over a network. Such malicious attacks may be aimed to control the STB's resources by gaining access to the root level of the STB's operating system. However, even if the STB is hacked and a malicious user manages to gain access to the root level of the STB's operating system, an intrusion detection agent operating at the super root level of the STB's operating system may prevent the malicious user or malicious process from causing an application to control or gain access to the STB's hardware, including its memory spaces. By limiting the unrestricted access to a user device's resources that root level access to a device's operating system would previously provide and by preventing any entity from obtaining super root level access to the operating system, malicious hackers may be prevented from controlling device resources in an unrestricted manner. This would prevent a malicious attacker from reading information stored on the STB or cause the STB to perform an action since the intrusion detection agent would not allow the malicious process with root level access to the STB's operating system to access the STB's hardware interfaces and/or memory units in an unrestricted manner. Instead, the intrusion detection agent may monitor all processes' access requests to device resources, whether such processes have standard user level access or super root level access to the operating system.

In some embodiments, the intrusion detection agent may execute on a dedicated security processor of a multi-processor computing device. For example, in a multi-core processor of a computing device, one processing core may function as a dedicated security processor on which the intrusion detection agent may operate to monitor processes implemented on other processing cores of the computing device. The intrusion detection agent may monitor every memory access and/or every I/O port access made by any application and/or process for any of the processing cores of the computing device. Such monitoring may be performed continuously to detect, in real-time, when a process is attempting to access a portion of the computing device that it has not been granted privileges to access. The intrusion detection agent may repeatedly authenticate each process of the computing device in hardware. For example, the intrusion detection agent may execute as a security monitoring entity on the dedicated security processor of a multi-processor computing device. In some embodiments, the dedicated security processor may be electrically connected to each input/output port of the computing device. For example, the dedicated security monitor may be directly or indirectly connected (e.g., via point to point processor interconnects) to each input/output pin of other processors on a multi-processor computing device and/or to each input/output port of the computing device. By having such a physical connection in hardware, the dedicated security processor may be able to monitor any incoming and/or outgoing data packet to each hardware interface and be able to verify whether such data into and/or out of the hardware interface is to be allowed. For example, the dedicated security processor may detect the validity of each incoming data packet being transmitted to the hardware interface by detecting the source of such data packet and whether the source has the privilege to communicate with the corresponding hardware interface. The dedicated security processor may be able to send a command to other processor(s) of the computing device and/or the hardware interfaces to prevent unauthorized communication from being successfully transmitted to the hardware interface(s). Such periodic hardware authentication may ensure with a high degree of confidence that no security breaches will be successful.

In some embodiments, the intrusion detection agent may allow only processes that are signed and validated to execute on the computing device. For example, each process that is run on the computing device may be authenticated in hardware using a cryptographic hash function. Different cryptographic hash functions may be used to authenticate and validate different processes. When a process is being validated in the computing device's hardware, its hash may be generated using the established hash function for that process and compared with a hash authentication code stored in the hardware for the validated version of the process. A portion or the entire source code, object code and/or executable code of the process may be hashed by the hash function to generate a message digest that may be compared against the hash authentication code. If the hash values (e.g., message digests and hash authentication code) match, then the process may be validated as not having been tampered. Such periodic monitoring of all processes running on the computing device may be used to guard against the tampering of any process as a result of a security breach. The intrusion detection agent may check whether a signed and trusted application and its processes have the privilege to access each hardware interface, memory area, device driver, and/or kernel operating system call before granting a process to access such computing device resources.

FIG. 1 shows an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not shown, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of computing devices 105-107, such as servers, that may be configured to perform various functions. For example, the local office 103 may include a push notification computing device 105. The push notification device 105 may generate push notifications to deliver data and/or commands to the various premises 102 in the network (or more specifically, to the devices in the premises 102 that are configured to detect such notifications). The local office 103 may also include a content server computing device 106. The content device 106 may be one or more computing devices that are configured to provide content to users at their premises. This content may be, for example, video on demand movies, television programs, songs, text listings, etc. The content device 106 may include software to validate user identities and entitlements, to locate and retrieve requested content, to encrypt the content, and to initiate delivery (e.g., streaming) of the content to the requesting user(s) and/or device(s). Indeed, any of the hardware elements described herein may be implemented as software running on a computing device.

The local office 103 may also include one or more application server computing devices 107. An application server 107 may be a computing device configured to offer any desired service, and may run various languages and operating systems (e.g., servlets and JSP pages running on Tomcat/MySQL, OSX, BSD, Ubuntu, Red Hat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push device 105, content device 106, and application server 107 may be combined. Further, here the push device 105, content device 106, and application server 107 are shown generally, and it will be understood that they may each contain memory storing computer executable instructions to cause a processor to perform steps described herein and/or memory for storing data.

An example premise 102a, such as a home, may include an interface 120. The interface 120 may include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem (s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), tablet computing devices 118, mobile phones 119, and any other desired devices. Examples of the local network interfaces include Multimedia over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
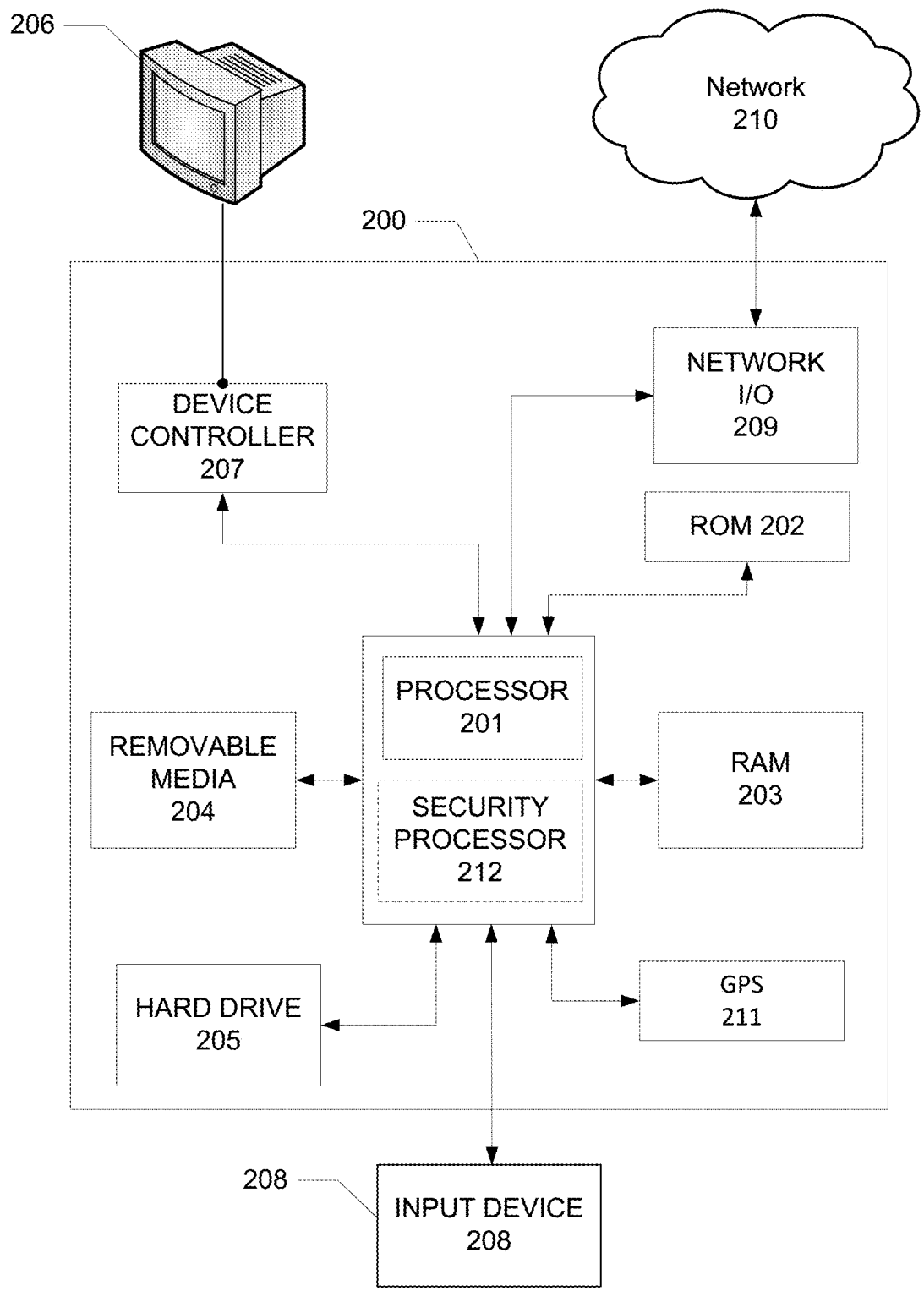
FIG. 2 shows an example computing device that may be used to implement any of the methods, servers, entities, and computing devices described herein.

FIG. 2 shows general elements that may be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may also include a security processor 212, which may execute instructions of a one or more computer programs to monitor the processes executing on the processor 201 and any process that requests access to any hardware and/or software components of the computing device 200 (e.g., ROM 202, RAM 203, removable media 204, hard drive 205, device controller 207, network I/O 209, GPS 211, etc.). The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which may be configured to receive and process global positioning signals and determine, with possible assistance from an external server and antenna, a geographic position of the device.

The example in FIG. 2 is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, security processor 212, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity may be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein. The various computing devices, servers and hardware described herein may be implemented using software running on another computing device.

Figure 3:
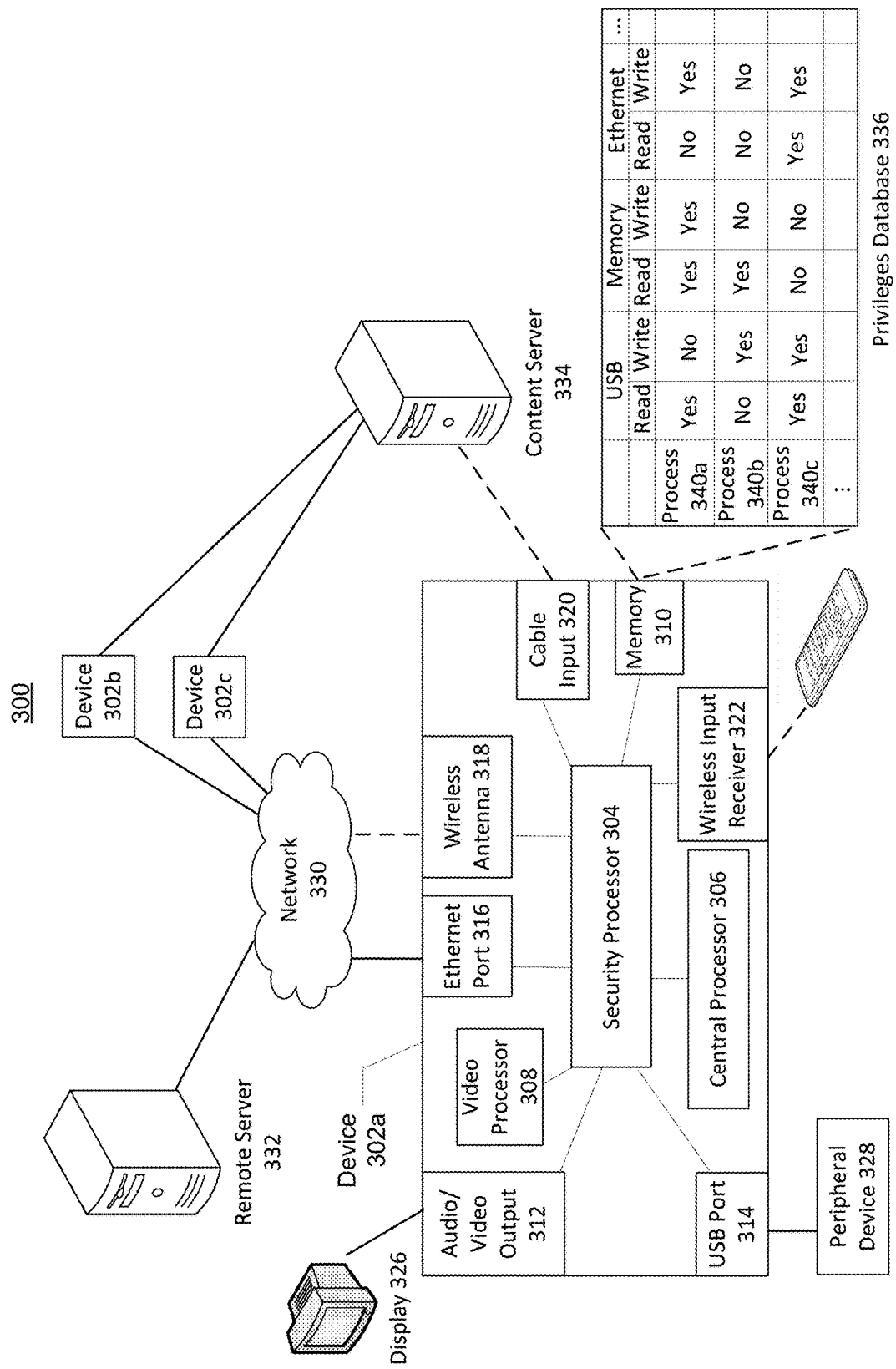
FIG. 3 shows an example hardware system on which features described herein may be practiced.

As noted above, features herein relate generally to performing real time security monitoring of processes running on a device using a kernel level intrusion detection agent. FIG. 3 shows an example hardware system 300 on which such features as described herein may be implemented. A remote server 332 may communicate with multiple user devices such as device 302a, 302b, and 302c over a network 330. A content server 334 may provide information to user devices 302a, 302b, and 302c. In the example shown in FIG. 3, device 302a is shown as a set-top box. However, devices 302a, 302b, and 302c may be any computing device described in FIGS. 1 and 2.

In the example shown in FIG. 3, device 302a may comprise multiple processors or processing cores, such as central processor 306, security processor 304, and video processor 308. The device 302a may comprise a memory unit 310, which may further comprise volatile and non-volatile memory units. The video processor 308 may instruct audio/video output port 312 of device 302a to output an audiovisual signal to a display device 326 through the audio/video output port 312. The central processor 306 may communicate with peripheral devices such as peripheral device 328 through a universal serial bus (USB) port 314. The device 302a may communicate with network 330 through a wired connection using an Ethernet port 316 or wirelessly communicate across network 330 using the wireless antenna 318. The device 302a may also receive data from a content server 334 from a cable input 320. A user may provide operational commands to the device 302a using remote control 324. The user device 302a may communicate with the remote control 324 using infrared signals or Bluetooth signals using wireless input receiver 322.

In some embodiments, the security processor 304 may be a dedicated processor of a multi-core device that monitors every hardware component of the multi-core device and every process executing on each of these hardware components. An intrusion detection agent, hereinafter also referred to as a super root monitor, may be implemented by the security processor 304 on an operating system level that is more privileged than an administrative root level of device 302a's operating system, hereinafter also referred to as the super root.

In most operating systems, a superuser in an administrator mode has root access to the operating system of a computing device. With such root level access, the superuser may access all commands, files, the computing device's I/O ports, memory areas, and all other hardware components of the computing device. While a device's applications and users only have access to a more restricted user mode, the superuser with root level access may read and write to any memory area, to any I/O port, and modify any operating system commands with unrestricted access. An operating system kernel that has root access may by default have permissions to permit an operation requested by the root superuser.

In the present disclosure, a super root level of the operating system may possess a greater level of control of the computing device's operating system than the administrative root level access allowed to administrative entities. The super root level may control access to an administrative root level of the operating system. The administrative root level user may have higher privileges to the computing device's resources than a standard user. For example, while the standard user may not be able to directly read data from and/or write to hardware interfaces or software interfaces of the computing device. The standard user may be limited to interacting with operating system GUIs to issue commands to applications that may be allowed in predefined and a limited manner to access the hardware interfaces or software interfaces of the computing device. However, the administrative root level user may have restricted access to directly read from/and or write to hardware interfaces and software processes of the operating system. For example, a root level user and/or kernel may be able to directly issue commands to certain hardware interfaces and may be able to directly issue system calls to operating system software processes. Each command issued by a root level kernel may be monitored and verified by the intrusion detection agent, which may be a super root level kernel. Kernels with super root level access to the operating system may be able to execute without any supervision and/or restriction. For example, the intrusion detection agent, also referred to as the super root monitor, may be an operating system kernel with super root level access that by default has unrestricted access privileges to the computing device's resources. A super root kernel may set permissions for the root level administrative access such that a superuser with root level access to the operating system cannot open a shell script and type commands to modify the operations of every hardware and software component of the computing device with unrestricted access.

In some embodiments, the intrusion detection agent may set privileges for a process of the operating system to access a component of the computing device. For example, the intrusion detection agent may define a set of privileges for each standard user process and for each root level kernel. Such a set of privileges may be stored in the hardware of device 302a, for example in memory 310 or in memory units of specific hardware components of device 302a as privileges database 336. The privileges database 336 may be stored in an encrypted region of the memory (e.g., a whitebox encrypted area of the memory 310). Additionally or alternative, the privileges database 336 may be stored in a memory unit of the security processor 304. A particular privilege in privileges database 336 may identify that a particular process and/or kernel is allowed to access a given hardware interface of device 302a and whether such process and/or kernel is allowed to read from and write to such a hardware interface. The privilege may identify the process and the hardware interface that it relates to. Additionally or alternatively, the intrusion detection agent may set one or more privileges for each hardware interface of device 302a, with each privilege specifying which process is allowed to access the given hardware interface. The set of privileges defined by the intrusion detection agent in the privileges database 336 may be used whenever any process is attempting to execute any operations on the software or hardware interface of device 302a to determine if such an operation is permissible. For example, when the security processor 304 intercepts a command, issued from process 340a (or 340b, 340c, etc.) executing on the central processor 306 to a hardware interface, such as the USB port 314, the security processor 304 may refer to the privileges database 336 to determine whether such a communication is allowed. The security processor 304 may further determine whether the command issued by process 340a is to read from or write to the USB port 314. The security processor 304 may determine that process 340a is allowed to read from USB port 314 but is not allowed to write to USB port 314. Upon determining that the command issued by process 340a is to write to the USB port 314, the security processor 304 may prevent transmission of such a command.

In some embodiments, the security processor 304 may be dedicated to monitoring the operations executing on each component of device 302a in real-time. The intrusion detection agent, which may be a kernel level agent of security processor 304, may set privileges for each process on the computing device to permit or restrict access to hardware and software components of the operating system. The security processor 304 may, for each process executing on device 302a, set access privileges related to components of the system, such as the central processor 306, video processor 308, security processor 304, memory 310, audio/video output 312, USB port 314, Ethernet port 316, wireless antenna 318, cable input 320, wireless input receiver 322, serial ports, external flash memory units, high definition media interfaces, ZigBee interfaces, optical interfaces, SATA interfaces, and any other hardware interfaces of device 302a. Each of these components may be hereinafter referred to as a hardware interface. The intrusion detection agent may also set privileges for several subcomponents of these hardware interfaces on a piece by piece basis. The intrusion detection agent may also set privileges for each application to access software resources such as key ladders, memory-to-memory decryptors, and timers used by device 302a. The intrusion detection agent may set also set privileges for each application and/or each application process executing on device 302a to determine whether an application may access certain memory controllers, make calls to device drivers, and have access to certain kernel level operating system calls. Each of these components may be hereinafter referred to as the software components of the device 302a. These privileges may be stored in the privileges database 336 and may be consulted by the intrusion detection agent or any other super root level kernels executing on the security processor 304 during real-time monitoring of the commands issued by the various application processes and/or kernels on the device 302a. The privileges database 336 may be stored in a memory unit of the security processor 304 (e.g. on-chip memory). Additionally or alternatively, the privileges database 336 may be stored in an encrypted memory location of a memory unit 310. For example, the privileges database 336 may be stored in a portion of memory 310, the contents of which may have been secured with an encryption technique such as whitebox cryptography in such a manner that the information from the privileges database 336, stored in the encrypted portion of memory 310, appears indistinguishable to a malicious attacker from the security key used to encrypt the information.

In some embodiments, the intrusion detection agent may prevent a malicious attacker who has gained root level access of device 302a from controlling operations of device 302a's processes and resources. By setting privileges for each application process and/or kernel to access software and hardware components of device 302a, kernels with root level access may have restricted access to certain device components. For example, if a malicious attacker with root level access wishes to manipulate a web browser application executing on device 302a to send an audiovisual signal to display device 326 on audio/video output 312, the intrusion detection agent will verify whether the web browser is authorized to send commands to the audio/video output 312. By setting privilege on each root level and standard level process in the privileges database 336, having the security processor 304 monitor each command issued by any of these processes, and determining whether such processes are privileged to access the requested device resource, the intrusion detection agent may prevent a malicious user with root level access from performing unauthorized operations on the device 302a. Furthermore, the intrusion detection agent may also validate the web browser application to determine that the web browser application may be trusted, including when it is being commanded by a user with root level access. For example, the intrusion detection agent may periodically perform a hash function on the web browser application and compare the resulting hash value against a locally stored authentication code to determine whether the browser's execution code has been tampered with and/or modified. Upon determining that the web browser application's execution code has not been modified from a previous time that the web browser application was trusted, the web browser may be allowed access to the device 302a's device resources if the privileges database specifies that the web browser application process is privileged to access the requested device resource. However, even if the web browser application has been validated, the intrusion detection agent may determine that the web browser is not allowed to read or write to and/or from the audio/video output 312 according to the privileges set in the privilege database 336. Accordingly, the intrusion detection agent may determine that a security breach is being attempted and may block the malicious attacker from controlling device 302a's resources, including prevention of the web browser application from communicating with audio/video output 312.

In some embodiments, the security processor 304 may validate each application and each application process executing on device 302a. The security processor may use cryptographic hash functions such as SHA-1 (secure hash algorithm) or MD5 message digest algorithms to generate digital signatures for each application and its related processes. Such cryptographic hash functions may perform a hash on information for each application process, such as a source code, a binary code, and/or an executable code of each application process, and generate corresponding hash values that may serve as fixed-length message digests. A cryptographic hash function may generate an identical hash value for an identical application process but may generate different hash values when input with different applications. Such hash values may be used in conjunction with encryption keys to create digital signatures used to authenticate and validate integrity of the corresponding application processes that are being processed by the cryptographic has function. For example, hash values for each application process on device 302a may be encrypted with encryption keys that are stored in a secured memory space such as memory 310. When an application process requests access to a hardware interface, the process may pass a memory pointer to the location in memory 310 where a portion or the entire application's source code, binary code, and/or an executable code begins, and the security processor 304 may retrieve a portion of the application source code, binary code, and/or an executable code. The security processor 304 may execute a hash function on the application source code, binary code, and/or an executable code to compare the result with the expected result (e.g., hash value stored in memory 310 for the corresponding application). In some embodiments, the security processor 304 may prevent the application process from detecting which portions of the application source code are being used to generate the hash value, in order to prevent a malicious user from manipulating such information to modify only portions of the source code that are not being hashed. For example, the security processor 304 may not share which portions of the source code of each application are used to generate hash with the application.

In some embodiments, one or more hash functions may be used to generate cryptographic hashes of the various application processes that are implementing on device 302a. The source code, binary code, and/or executable code for such a hash function may be stored on the device 302a (e.g., in memory 310 and/or a memory of the security processor 304). The security processor 304 may generate digital signatures for the various application processes executing on the device 302a using the one or more hash functions stored on device 302a. The one or more hash functions may be implemented in various different programming languages (JavaScript, Ruby, C, C++, Python, Pascal, etc.). Each of the one or more hash functions may be considered an application process executing on the device 302a and accordingly the source code, binary code, and/or executable code of each of the one or more hash functions may also be digitally signed. The security processor 304 may validate the hash function and upon validating that the hash function has not been corrupted and/or modified, the security processor 304 may use the validated hash function to generate a hash of one or more application processes on the device 302a and compare the generated hashes against the respective hash values stored in memory for a given application process(es).

When the security processor 304 validates an application process, it may compare the hash value generated as a result of processing the application process with a trusted hash value that was previously generated for that same process. If the two hash values do not match, the security processor 304 may determine that the application process in question may have been corrupted or modified and is no longer valid. In response to such a determination, the security processor 304 may prevent the application process from performing some or all operations on device 302a. The trusted hash values that are used by the security processor 304 in validation checks may be stored in device 302a's hardware. For example, the intrusion detection agent may store each trusted hash value in memory 310. In monitoring the security of device 302a, the intrusion detection agent may routinely perform such hash function validation of each application process executing on device 302a.

In some embodiments, the intrusion detection agent may perform such validation of application process at specific times or in response to specific events. Certain critical application processes that control system resources have been determined to be most critical resources may be periodically monitored within a predetermined time interval. The time interval may vary from application to application and across different system resources that the application may control. The time interval during which the security processor 304 may verify that an application has been validated may be limited. For example, the security processor may not perform validation testing on an application again if it has tested it within 1 second. In another embodiment, the intrusion detection agent may validate the application process before the application process attempts to perform an operation, such as issue a command or access a hardware interface or software interface. For example, if a web browser application generates a display for outputting to audio/video output 312, the intrusion detection agent may place the web browser application in a suspended state in the operating system and validate the web browser application immediately before the web browser issues the command to audio/video output 312. In this manner, the intrusion detection agent may determine that the application has not been corrupted before it does any operation on the device 302*a*.

In some embodiments, the security processor 304 may monitor each process conducted on central processor 306. The intrusion detection agent may instruct a validation engine executing on the security processor 304 to validate and check commands that processes executing on the central processor 306 issue to other components of device 302*a*. The intrusion detection agent may instruct the validation engine to monitor certain device drivers and I/O ports more strictly than others. For example, the intrusion detection agent may set validation criteria that require validation for processes accessing Ethernet port 316 and audio/video output 312 more stringently and more frequently than for processes accessing a peripheral device 328 that is not often used.

In some embodiments, privileges for each application process may be dynamically changed. The intrusion detection agent may be able to modify these privileges to grant trusted processes with higher privileges or privileges to access additional software and hardware components of device 302*a*, as deemed necessary for the trusted process's continued execution. For example, the security processor 304 may allow a trusted process with the ability to access additional hardware interfaces and software resources by modifying the privileges associated with a trusted process in the privileges database 336. While the intrusion detection agent having super root privileges may modify such privileges stored in the privileges database 336, no other process or kernel level agent, including those having root level access to device 302's operating system, may be able to modify such access privileges. The ability to modify the privilege database 336 may be granted only to kernels having super root level access to the operating system of device 302*a*.

In some embodiments, the intrusion detection agent running on security processor 304 may monitor for attempts to modify privileges granted to different application processes. Malicious users often launch attacks on an operating system by modifying the decision making mechanism of an application process, driver, and/or system resource for determining whether it has the requisite privilege to access a particular software resource, hardware interface and/or memory location of the computing device. For example, in conventional systems, malicious users may launch an attack on the operating system of the computing device by modifying the privileges of certain processes that are not otherwise allowed to access a particular set of hardware interfaces and/or memory locations to allow such processes to access such hardware interfaces and/or memory locations. The malicious user may then instruct such an application process executing on a conventional computing device to access its hardware interfaces and/or write to memory locations that were previously inaccessible to the application process to perform malicious tasks as part of a security breach. The intrusion detection agent may monitor for modifications of the privileges of application processes. For example, the intrusion detection agent may monitor to detect when a process and/or user is attempting to modify and/or overwrite the privileges stored in privilege database 336 of memory 310. The intrusion detection agent may monitor for malicious users and/or malicious processes that are attempting to intercept processes that are executing on the computing device and tamper with their privilege checking determinations. For example, the intrusion detection agent may monitor for user commands and/or processes that intercept an application process's binary code and modify the portion of the code responsible for determining whether a process is privileged to access one or more hardware interface and/or operating system resource. The intrusion detection agent may also monitor for user commands and/or processes that attempt to modify the determination made by a processor such as the central processor 306 and/or security processor 304, during runtime execution of the application process, as to whether the executing application has the privilege to access the hardware interface and/or operating system resource that it has requested to access. The intrusion detection agent may monitor for tampering and/or overriding control of such a determination by an external process and/or user. In particular, the intrusion detection agent may also monitor when an external process and/or user is attempting to change the privileges and/or the privilege determination to allow an application process with the privilege to access to a previously unprivileged hardware interface, memory location, and/or operating system resource. Upon detecting any such tampering, the intrusion detection agent may terminate the application process that is being tampered and/or subject to the malicious attack.

In some embodiments, the intrusion detection agent may detect attacks on the device 302*a* that cause application processes, drivers, and/or kernels executing on the device 302*a* to modify a memory location, read secure memory locations, and/or perform other types of malicious behaviors. The intrusion detection agent may determine when a process and/or user is attempting to modify an operating system kernel and/or configuration, which is executing at the root level of the operating system, in runtime to execute tasks, drivers, kernel functions to modify portions of the memory 310, a memory of the central processor 306 and/or security processor 304, and/or access unprivileged hardware interfaces to perform malicious behaviors. By checking the validity of such an attempted modification of the root level operating system kernel and/or the validity of the tasks, drivers, kernel functions, and/or other application processes launched by the malicious process and/or user, the intrusion detection agent may be able to detect that these modified application processes, tasks, kernel functions are unsigned and cannot be successfully validated. Accordingly, the intrusion detection agent may terminate such modified processes and/or kernel modifications from executing and/or implementing changes on the device 302*a*.

In some embodiments, the intrusion detection agent may determine whether malicious hackers are adding source and/or binary code into an unused memory location and calling upon that inserted code to perform malicious operations on the device 302*a*. For example, the intrusion detection agent may monitor for source and/or binary code that is written to a memory location of the memory 310 and/or a memory of the central processor 306 or security processor 304. In order to prevent malicious users and processes from modifying a memory stack and calling upon code inserted into a memory location of the device 302*a* to execute malicious processes on the device 302*a*, the intrusion detection agent may also monitor for any changes made to a memory stack in any of these memory units of device 302*a*.

Upon detecting any such changes to the memory, the intrusion detection agent may validate such changes made to the memory. For example, the intrusion detection agent may perform a hash function on the inserted code and determine whether the output hash value matches with a hash value associated with that portion of memory and/or that source/binary/executable code. If the intrusion detection agent determines that this code does not have a hash value (e.g. the inserted code is unsigned), then the intrusion detection agent may instruct the central processor and/or the security processor 304 to remove the inserted code and terminate any processes that may have been generated using the inserted code.

In some embodiments, the intrusion detection agent may instruct the security processor 304 and/or the central processor 306 to perform one or more actions upon detecting malicious activity being performed on the device 302a. For example, the intrusion detection agent may rely on certain triggering events to launch such actions. One example of such a triggering event may include detecting that attempts have been made to modify privileges granted to different application processes. Another example of a triggering event may include detecting that application processes, drivers, and/or kernels executing on the device 302a have been instructed by an external user and/or application process to modify a memory location, read secure memory locations, and/or perform other types of malicious behaviors. Another example of a triggering event may include detecting that an attempt has been made to add source and/or binary code into an unused memory location and that inserted code is being called upon to perform malicious operations on the device 302a. Once the intrusion detection agent detects such triggering events, the intrusion detection agent may detect that a security breach is being made and accordingly it may instruct the central processor 306 and/or the security processor 304 to report the security breach and its details to the remote server 332, which may be responsible for instructing device 302a on next steps for responding to the security breach. Additionally or alternatively, the intrusion detection agent may, in response to such a triggering event, instruct the central processor 306 and/or the security processor 304 to cause the device 302a to terminate all application processes executing on the device 302a and/or cause the device 302a to be rebooted. Additionally or alternatively, the intrusion detection agent may, in response to such a triggering event, instruct the central processor 306 and/or the security processor 304 to terminate the offending code fragment from executing on device 302a. For example, the intrusion detection agent may identify which code fragment of the source/binary/executable code is causing an unsigned application process from executing on the device 302a and may instruct the central processor 306 and/or the security processor 304 to terminate the offending code fragment on device 302a. Additionally or alternatively, the intrusion detection agent may, in response to such a triggering event, instruct the central processor 306 to display a message on the user interface of device 302a (e.g. through audio/video output 312 to display 326 and/or USB port 314 to peripheral device 328) that malicious behavior has been detected on device 302a.

In some embodiments, the intrusion detection agent may secure secrets on device 302a using the techniques described in this disclosure. For example, the intrusion detection agent may facilitate storage of passwords, signed applications' critical application data, encryption keys, user information such as credit card information, etc. in highly guarded portions of memory 310. By frequently monitoring any applications that access such a memory space, for example by checking their access privileges and digital signatures to verify that the application is trusted, the intrusion detection agent may provide an additional level of security to such already encrypted information. Such secrets may be encrypted using encryption keys stored in memory 310. Such encryption keys may be protected by the intrusion detection agent against any processes that have access to memory 310. Privileges to access such encryption keys may be restricted to all applications except the super root level intrusion detection agent. The intrusion detection agent may also modify such encryption keys so that they may only be read by an intrusion detection agent specific to device 302a.

In some embodiments, the security processor 304 may continuously monitor the intrusion detection agent to determine if the intrusion detection agent itself is compromised. In the event that the intrusion detection agent is compromised, the security processor 304 may terminate all applications that had privileges granted to system resources, terminate the intrusion detection agent, and restart device 302a.

In some embodiments, the remote server 332 may establish communication with an intrusion detection agent executing on the super root level of a user device's operating system. In order to communicate with such a privileged kernel, the remote server 332 may use a remote command agent to instruct the intrusion detection agent to provide the remote server 332 with security information related to device 302a. This may allow a network operator at remote server 332 to monitor and communicate with intrusion detection agents at each of the user devices of each of its users. The remote command agent may be executed on security processor 304 of device 302a and it may listen for commands from the remote server 332. The remote command agent may essentially be a gate-keeper for external on-demand commands from remote server 332. The remote command agent may validate the integrity of incoming commands and upon successfully verifying incoming commands forward them to the intrusion detection agent.

In some embodiments, a remote server 332 may also monitor the real-time security monitoring results conducted at various user devices such as device 302a, 302b, and 302c. The remote server may have access to cryptographic hash functions to be used to validate the application processes executing on devices 302a, 302b, and 302c. The remote server 332 may be a computing device that may identify which processes are running on each user device. Remote server 332 may determine that a given user device (e.g., device 302a) has a web browser application installed as part of the installed processes of the device 302a. For example, the security processor 304 may continuously monitor which applications are installed and their corresponding processes. The security processor 304 may communicate a list of which applications are installed on device 302a to the remote server 332. In response to such a determination, the remote server 332 may transmit, to device 302a, the cryptographic hash function that may be used to validate the web browser application process executing on device 302a. The remote server 332 may also instruct the intrusion detection agent on device 302a to use the identified hash function to validate the web browser application. The remote server may monitor processes executing on multiple user devices and transmit hash functions to each of them. In some embodiments, the remote server 332 may instruct the device 302a which portions of the source code of each application the hash function should be executed on. In some other embodiments, each user device may execute the hash function on the entire source code of the application. In yet another embodiment, each user device may be able to identify the appropriate portions of the source code on which the hash function is to be executed upon.

In some embodiments, security monitoring and validation of each application process for a given user device such as device 302a may be performed partially by remote server 332 and partially by the security processor 304 of device 302a. The remote server 332 may perform an initial hash of the application process and transmit the trusted hash value, also referred to as an authentication code, to device 302a. Once the remote server 332 receives a message from the device 302a that an application has been newly installed on the device 320a, the remote server 332 may identify a corresponding hash function for such an application. The remote server 332 may retrieve the source code for the identified function and perform the identified hash function on certain portions or the entire source code to generate an authentication code. The remote server 332 may identify which portions of the application's source code the hash function should be performed on. The remote server 332 may transmit the authentication code (e.g., the hash value or message digest output from performing the hash function on the source code of the retrieved application) to the device 302a. The security processor 304 of device 302a may store such an authentication code in its memory 310 and compare that value against hash values generated when that application process is validated by the security processor 304. Upon receiving an authentication code from server 332, each device may perform application process validation on its own periodically using the authentication code.

In some embodiments, the remote server 332 may provide user devices with updated hash functions for validating their application processes. The remote server 332 may send an application update to the device 302a. Once such an application update has been transmitted to device 302a, the remote server 332 may also identify that a different hash function may be required to validate the updated application instead of the hash function used by device 302a to previously validate the non-updated version of the application. In response to such a determination, the remote server 332 may transmit the different hash function to device 302a and a corresponding authentication code to the device 302a. The remote server 332a may have access to a database of applications and their related hash functions. When an application is updated, the remote server 332 may also be updated with the hash function used for the updated application. In some embodiments, the remote server 332 may assign a random hash function to each application, while ensuring that each version of the application is associated with a unique hash function. In some other embodiments, an application source (e.g., the author of the application) or a security provider (e.g., the cable headend) may specify which hash function is to be associated with each application running on the device 302a. Since the security processor 304 on device 302a may repeatedly validate each process on the device 302a to check at periodic time intervals whether each application process is still valid and has not been corrupted, the security processor 304 may use the updated hash function and authentication code to repeatedly validate the updated application process instead of using the old hash function and authentication code that were used to validate the application before the application was updated.

In some embodiments, device 302a may transmit security logs to remote server 332. In such a security log, the security processor 304 may report an unauthorized attempt made by a process on device 302a to access a hardware or software component that it did not have the privilege to access. The remote server 332 may receive such logs from multiple different user devices and determine which processes need to be terminated. The remote server 332 may observe the activities of the process that is seeking unusual control of device resources. For instance the log reported to remote server 332 may include a timestamp of the unauthorized access, the name of the application requesting such access, the exception details related to the unauthorized access, and the status of the intrusion detection agent related to its validity at the time of the unauthorized access. Once it has identified the malicious processes that need to be terminated, the remote server 332 may instruct the intrusion detection agent of device 302a, via the remote command agent, to terminate one or more process identified by the security log as having attempted unauthorized access to the components of device 302a.

In some embodiments, the remote server 332 may implement policy changes to be executed on multiple different user devices (e.g., device 302b and device 302c) in response to security breaches reported by a user device 302a. For example, the remote server 332 may determine what types of security breaches the device 302a has been subjected to and may determine policies to implement to safeguard against similar security breaches in the future. The remote server 332 may instruct other devices (e.g., devices 302b and 302c) to implement such policies based on what the remote server 332 may have learned from reviewing the security logs of device 302a. Policies to safeguard against future security breaches may include transmitting a log of known malicious process and their symptoms to user devices along with instructions to detect and terminate such processes when detected to be running on the devices.

In some embodiments, various other remediations may be implemented in the event a privilege is violated. In some embodiments, various events may be correlated in order to determine a remediation, for example a login event combined with processes being spawned may match a known intrusion signature or pattern, and therefore a corresponding remediation policy may be invoked. For example, some remediations may include the terminating of a process while others may include the terminating of a video stream.

Figure 4:
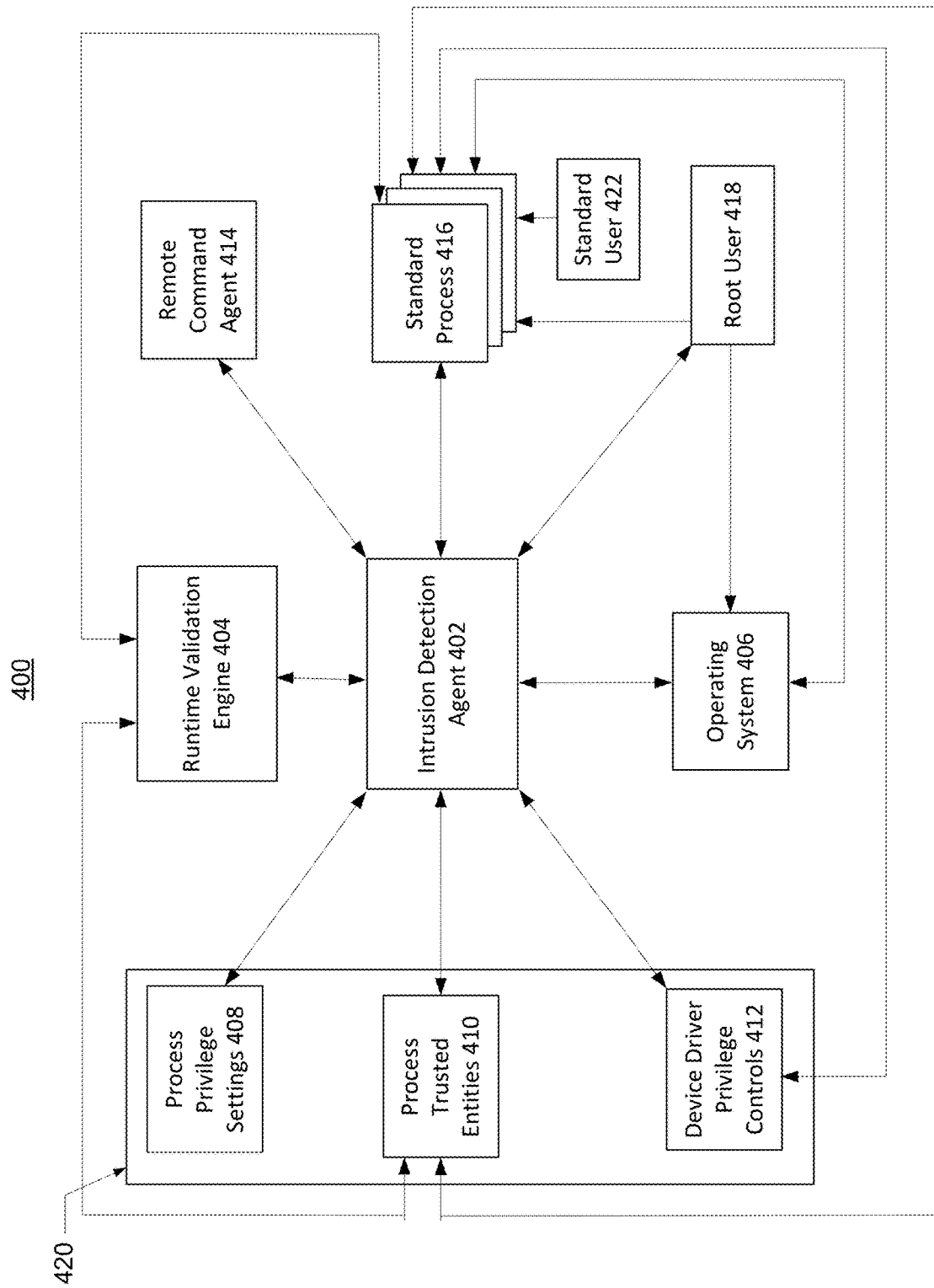
FIG. 4 shows an example security monitoring system on which features described herein may be implemented.

FIG. 4 shows an example security monitoring system 400 on which features described herein may be implemented. In some embodiments, the security monitoring system 400 may be implemented on a computing device such as device 302a of FIG. 3. For example, the intrusion detection agent 402, runtime validation engine 404, and remote command agent 414 may be implemented on a security processor such as security processor 304 as described in FIG. 3. The operating system 406, process trusted entities 410, device driver privilege controls 412, and standard process 416 may be implemented on a central processor such central processor 306 of FIG. 3. The process privilege settings 408 may be stored in a memory unit such as memory 310 of FIG. 3.

In some embodiments, the intrusion detection agent 402 may be a kernel level agent with super root access to the operating system 406. The intrusion detection agent 402 may monitor each standard process 416 executing on the computing device to validate the standard process 416 periodically and also to check that the standard process 416 has the privilege to access the computing device's hardware interfaces and portions of operating system 406 that the standard process 416 may request during its operation. The intrusion detection agent 402 may also communicate with a root user 418 with administrative privileges and a standard user 422 to ensure that the root user 418 and/or standard user 422 do not perform any operations or instruct any portions of the computing device to perform any operations that are unprivileged. In order to check whether an operation about to be performed on the computing device is to be permitted, the intrusion detection agent 402 may consult the process privilege settings 408. The intrusion detection agent 402 may also validate each application process executing on the computing device periodically or in response to a specific event by instructing the runtime validation engine 404 to authenticate and verify the integrity of the application process. While an application process is executing on the computing device, the intrusion detection agent 402 may also validate process trusted entities 410 that are associated with the standard process 416. While standard process 416 may be a standalone application that the user device would use, a process trusted entity may be additional source code used by different standalone applications to supplement their own source code. However, a process trusted entity may not be a standalone application of its own. The intrusion agent may detect that a process trusted entity is related to a given process by examining the source code of the process and determining which of the process trusted entities 410 are called out in the source code of the given process. Certain applications may be hacked in a manner such that while the source code of the application itself may not be corrupt, its execution may corrupt a process trusted entity. By validating a process trusted entity while its related standard process 416 is executing, the intrusion detection agent 402 may be able to detect whether the process trusted entity was corrupted as a result of the execution of its associated standard process 416. Similarly, the intrusion detection agent 402 may also validate each device driver called upon by the standard process 416 during its operation to ensure that the standard process 416 is privileged to access these device drivers. The intrusion detection agent 402 may also check to determine whether each process that requests access to a device driver is allowed to access the device driver by consulting the device driver privilege controls 412. The device driver privilege controls 412 may be similar to the process privilege settings 408 in specifying which processes are allowed access to the device drivers. While process privilege settings 408 may include the privileges for each hardware interface that each process is allowed to access, the device driver privilege controls 412 may include a mapping of privileges of processes to each device driver of the device 302a.

In some embodiments, the runtime validation engine 404 may validate a standard process 416 by authenticating and verifying its data integrity to ensure that standard process 416 has not been comprised in a security breach. The runtime validation engine 404 may periodically run a cryptographic hash function on standard process 416 to check its validity. Similarly, the runtime validation engine 404 may also check the validity of any process trusted entities 410 that may be called upon by the standard process 416 during its operation. For example, each time that a standard process 416 calls upon a process trusted entity, a flag may be sent to the intrusion detection agent 402 to validate the process trusted entity. The runtime validation engine 404, under the instruction of the intrusion detection agent 402, may also validate kernel modules of the operating system 406. The intrusion detection agent 402 may instruct the runtime validation engine 404 to validate application processes, process trusted entities, and kernel modules in response to determining that such elements are about to perform an operation on one or more of the computing device's hardware interfaces or operating system 406. The runtime validation engine 404 may retrieve an authentication code, one that may be stored locally on the computing device, to compare against a message digest or hash value generated upon running a cryptographic hash function on the application process, process trusted entity, or kernel module. The authentication code may be an encrypted hash value generated upon running the cryptographic hash function on a known to be trusted version of the application process, process trusted entity, or kernel module. The runtime validation engine 404 may use an encryption key stored in memory to decrypt the authentication code and use it to verify that the newly generated hash value matches. Upon successful verification, the runtime validation engine 404 may transmit a message to the intrusion detection agent 402 that the application process, process trusted entity, or kernel module it was verifying is valid. The runtime validation engine 404 may also append a signature to the application process, process trusted entity, or kernel module indicating its validity. Such a signature may be valid for a certain duration of time, after which the application process, process trusted entity, or kernel module may need to be validated again before it performs further operations on the computing device.

In addition to monitoring the validity of each application process, process trusted entity, or kernel module on the computing device, the intrusion detection agent 402 may also check to see whether such elements have the privilege to access the components of the computing device that they are requesting to access or modify. The intrusion detection agent 402 may verify that each process that is requesting to access a particular hardware interface, make an operating system call, access a device driver, access a kernel, or any other software component of operating system 406 has the privilege to do so. Such privileges may be stored in the process privilege settings 408, a database that comprises associations between processes and the components that they are privileged to access. The intrusion detection agent 402 may update the privileges stored in process privilege settings and it may add new privileges. For example, if a standard process 416 that has never previously requested access to a hardware interface such as a display device requests such access, the intrusion detection agent 402 may determine whether the standard process 416 should be given access to the display device and/or its associated device drivers. In making such a determination, the intrusion detection agent may communicate with a remote server and/or instruct the runtime validation engine 404 to validate the standard process 416, even if the standard process 416 was validated within a time period shorter than the duration of time in which it is routinely validated. The remote server may communicate with the intrusion detection agent 402 to determine the nature of the request of standard process 416 and collect information on standard process 416. The remote server may transmit instructions on whether to grant or deny the standard process 416 access to the display device upon determining whether the standard process 416 poses any security threat or is similar to known processes that have posed security threats on other devices that the remote server monitors. Upon receiving these instructions from the remote server specifying the degree of security threat the standard process 416 has posed to other monitored user devices, the intrusion detection agent 402 may permit the device with an access privilege to a hardware interface in process privilege settings 408 if the instructions received from the remote server specify that the standard process does not pose a significant security threat. Once the standard process 416 is executed, the intrusion detection agent 402 may allow the standard process 416 to access the requested hardware interface if the process privilege settings 408 allow access and if the standard process 416 has been validated. Privileges may be granted to each user process based on the process's validated process identifier. Process privilege settings 408 may be securely stored in the computing device's memory using one or more levels of encryption. The intrusion detection agent 402 may be equipped with the necessary encryption keys to access the process privilege settings 408. The process privilege settings 408 may only be accessible to super root processes. Standard process 416, standard user 422, and root user 418 may be prevented to access or modify process privilege settings 408.

In addition to checking the privileges of application processes before the application processes executes, the intrusion detection agent 402 may also check whether the shared objects or process trusted entities 410 and device drivers called upon by application processes have the appropriate privileges. For example, as the process executes, it may make an execution call to a process trusted entity in order to complete successful execution of the process. Since the process trusted entity 410 is external to the standard process 416 and may not have been validated and have its privileges verified, the intrusion detection agent 402 may instruct runtime validation engine 404 to validate the process trusted entity 410 as the standard process 416 is executing. The intrusion detection agent 402 may also check to see if the process trusted entity 410 has the privileges to access the hardware interface or software components that it may be instructed to access. Similarly, any device drivers relied upon by a standard process in communicating with a hardware interface may be validated. The privileges for the device drivers may be stored with the device drivers as device driver privilege controls 412 and may be accessed by the intrusion detection agent 402 in verifying that the standard process 416 has privileged access to the device drivers. Such device drivers may be validated and the privilege of the standard process 416 to access them may be verified as the standard process 416 executes.

In some embodiments, the intrusion detection agent 402 may define privileges for various applications and/or application processes during the build process of applications. When an application process, process trusted entity, or kernel module is being generated or compiled, the intrusion detection agent 402 may instruct the build process to include an indication of which hardware and software elements the application process, process trusted entity, or kernel module is allowed to access. In some embodiments, the intrusion detection agent 402 may identify such an indication for which application process, process trusted entity, or kernel module the process is allowed to access and annotate such a privilege in process privilege settings 408 and/or device driver control privileges 412. In some other embodiments, the intrusion detection agent 402 may include such privileges into the source code of the application process. The intrusion detection agent 402 may be aware that such a portion of the source code of each application process may not be used when the source code of the process is being hashed to validate the process. When the intrusion detection agent 402 determines that a new application process, process trusted entity, or kernel module is being generated, the intrusion detection agent 402 may check process privilege settings 408 and device driver privilege controls 412 to determine which hardware and software elements the application process, process trusted entity, or kernel module has access to and may append such privilege in the source code of the application itself. By appending the privilege to the source code of the application process itself, the intrusion detection agent 402 may not have to refer to process privilege settings 408 or device driver privilege controls 412 to check whether the process is privileged to access a hardware interface or a software component each time the process requests such access. Instead, the intrusion detection agent 402 may check the source code of the requesting process to determine whether the process is allowed access to such requested resource by default.

In some embodiments, the intrusion detection agent 402 may access an encrypted memory portion 420 of the device 302a's memory in order to monitor the security of the device 302a. For example, the process privilege settings 408, process trusted entities 410, and device driver controls may be stored in encrypted memory portion 420 of the device 302's memory. Additionally or alternatively, the encrypted memory portion 420 may be a portion of the security processor 304's memory and/or the central processor 306's memory. The contents of the encrypted memory portion 420 may be encrypted using an encryption technique such as whitebox cryptography in such a manner that the information stored in the encrypted memory portion 420 appears indistinguishable to a malicious attacker from the security key used to encrypt the information. The intrusion detection agent 402 may be configured to access any one of the process privileges 408, process trusted entities 410, and device driver privilege controls 412, stored within such an encrypted memory portion 420 in order to determine which application processes have the privileges to access specific hardware interfaces of the device 302a and/or system resources of the operating system 406.

In some embodiments, a root user 418's actions may be monitored by the intrusion detection agent 402 to monitor security breaches. Since a root user 418 may be allowed root access to the operating system 406 and allowed to command components of operating system 406 that may not be available to a standard user, the intrusion detection agent 402 may monitor each command issued by the root user 418 to operating system 406 and any processes executing on the computing device. By checking to see if the processes that root user 418 controls have access privileges to the hardware and software processes they access, the intrusion detection agent 402 may ensure that the root user 418 is not using any processes in an unauthorized manner that would result in a security breach or undesired action. The intrusion detection agent 402 may prevent the root user 418 from spawning a root shell unless the process privilege settings 408 associate such a privilege with the root user process. The root user 418 may also have privileges associated with it allowing it to perform certain operations and prevent it from performing others. Such privileges may be set in the super root level by the intrusion detection agent 402. Any attempt to access the root user privileges may be controlled by super root processes such as intrusion detection agent 402. Similarly, a standard user 422's actions may be monitored in a similar manner as described above with relation to that of a root user 418. Although the standard user 422 may not have access to a root level of the operating system, the intrusion detection agent 402 may monitor for commands and/or processes initiated by the standard user 422 that cause unsigned processes (e.g., processes that are not validated) to access unprivileged hardware interfaces and/or operating system resources of the operating system 406.

In some embodiments, certain privileges may be restricted for all applications. For example, the intrusion detection agent 402 may restrict each process on the computing device from being allowed to achieve kernel mode access, from loading kernel modules, and from cloning any super root kernel agents, such as intrusion detect agent 402, or creating a new super root kernel agent. In some embodiments, certain privileges may be assigned to specific trusted application processes. For instance, the intrusion detection agent 402 may allow certain application processes with access to the display device, the secure zone, the secure data, video decoders, and I/O buffers etc. These application processes that are trusted with access to these valuable resources may have stricter validation criteria than other processes. For example, the intrusion detection agent 402 may require more frequent validation of these application processes to maintain a higher level of trust required to access the more privileged hardware and software elements of the computing device.

In some embodiments, the remote command agent 414 may facilitate communications between components of security monitoring system 400 and an external computing device such as a remote server. The remote command agent 414 may perform security checks on information received from the external computing device to ensure that it is not corrupted and it does not include any malicious data that would cause an element of the security monitoring system 400 to be subject to a security breach. The remote command agent 414 may be called by the intrusion detection agent 402 to communicate with the remote server and transmit real time monitoring information about the status of standard process 416 and requests to access hardware and software components of the computing device.

Figure 5A:
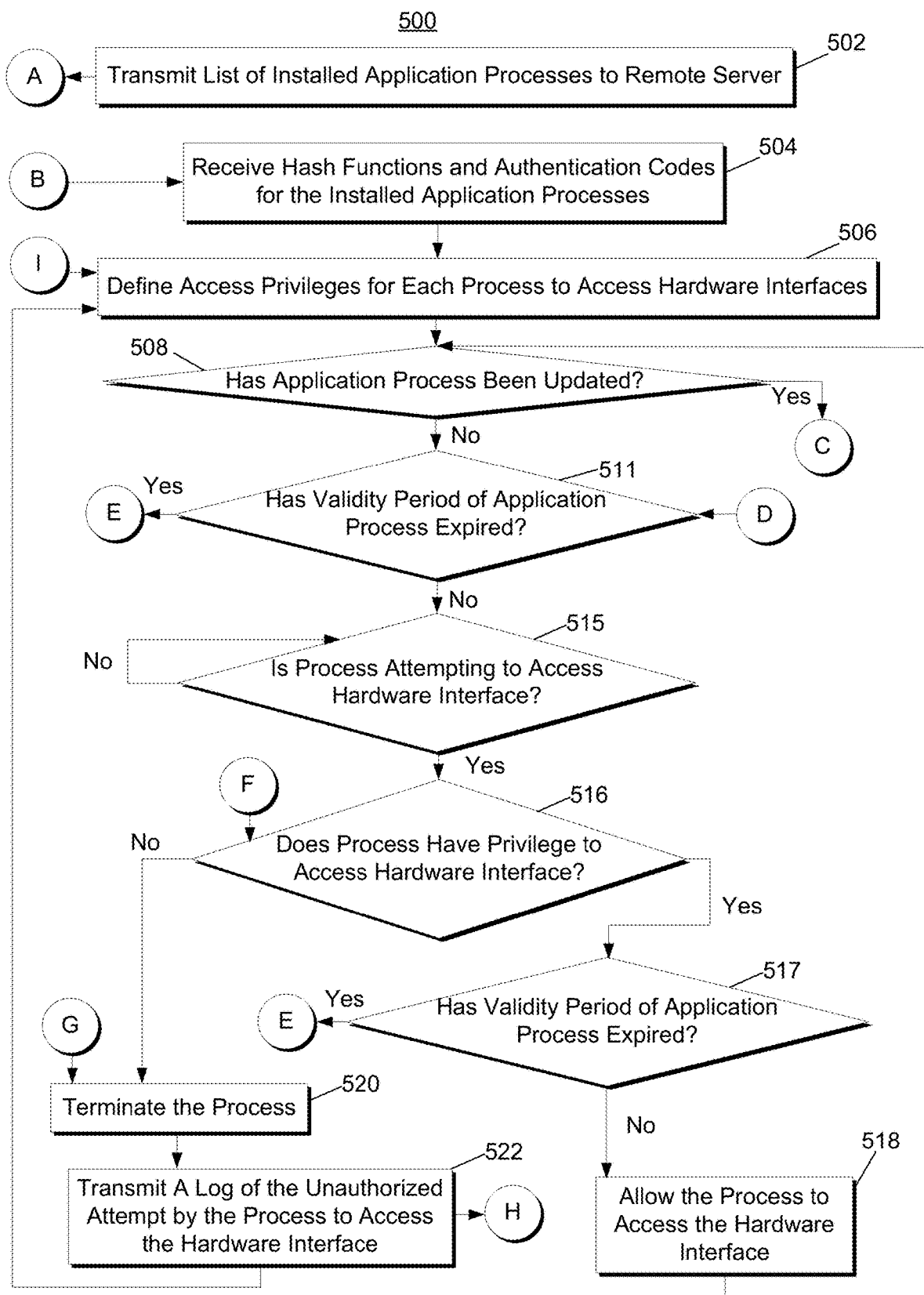
FIGS. 5A, 5B, 6A, 6B and 6C show example algorithms illustrating features described herein.
Figure 5B:
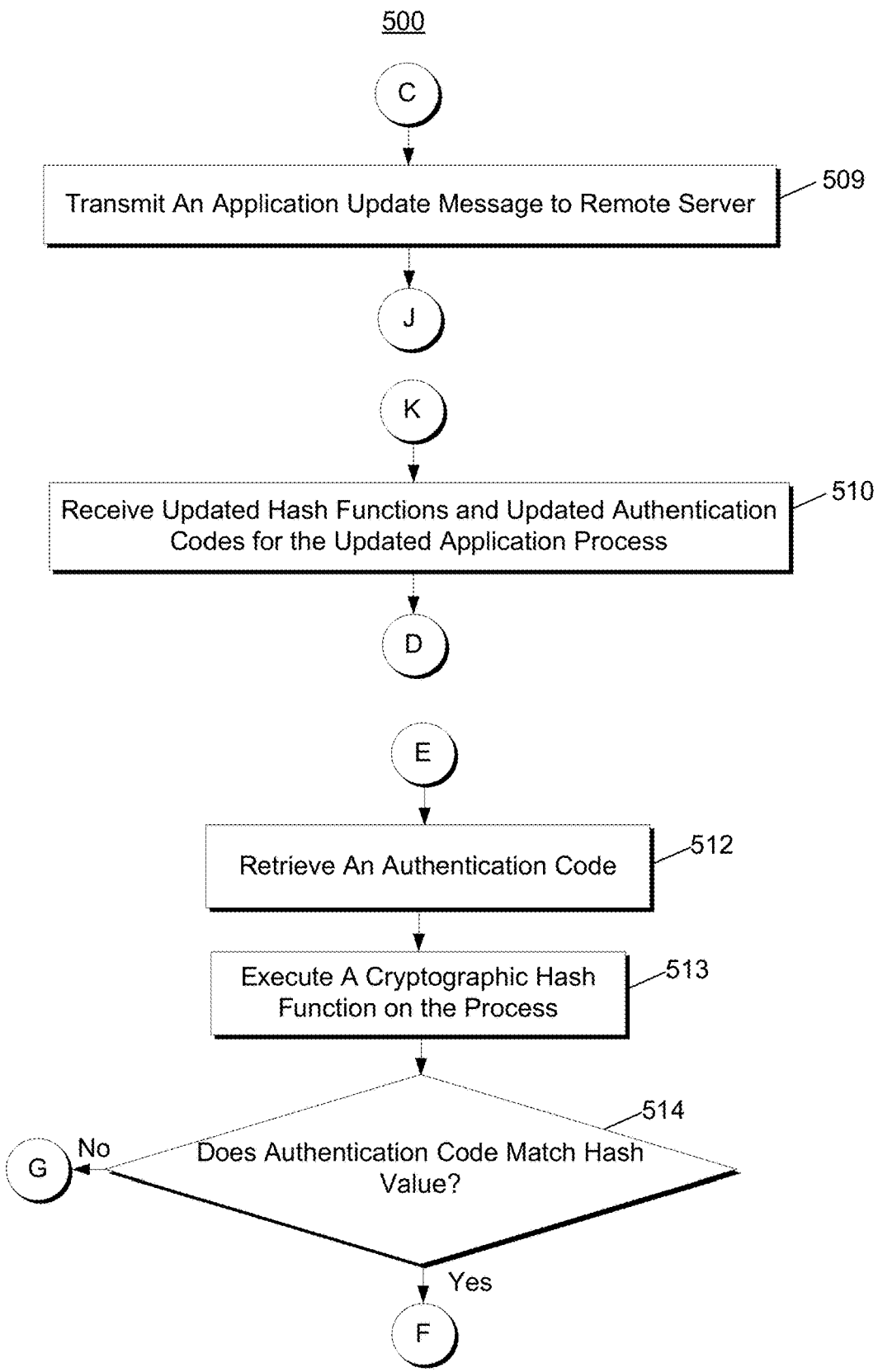

FIGS. 5A and 5B show an example method 500 whose steps may be performed by the various components in the systems shown in FIGS. 1-3. The process may be implemented by an intrusion detection agent on a security processor of a computing device at the computing device's super root operating system level.

In step 502, a list of installed applications and/or application processes may be transmitted to a remote server. Applications which have been installed on the computing device may be identified and a list of such applications may be sent to a remote server. The list of installed applications may be sent to remote server in order to receive materials from the remote server required to perform security monitoring on the device for these installed applications and their related processes.

In step 504, hash functions and authentication codes corresponding to the installed applications may be received from the remote server. In response to transmitting the list of installed applications and related application processes, the computing device may receive corresponding hash functions for these installed applications to perform security validation on them. Authentication codes for each of the applications may also be received from the remote server. Each application may be validated by executing a corresponding hash function received from the remote server on a portion of the application's source code. The resulting hash value may be compared against the corresponding authentication code received from the remote server to validate the application.

In step 506, access privileges to access hardware interfaces may be defined for each process executing on the computing device. For example, privilege settings indicating which application processes, process trusted entities, and kernel agents are allowed to access the different hardware interfaces of the computing device may be generated. Such privileges may be generated by a super root level kernel agent such as an intrusion detection agent described in FIGS. 3 and 4. Additionally or alternatively, such privileges may be defined by a server remotely located from the computing device and transmitted to the computing device. Such privileges may be defined by monitoring the past actions and code of the application process, process trusted entity, or kernel agent. Additionally or alternatively, instructions to modify certain access privileges may be received from a remote server. In response to receiving instructions to modify access privileges, the intrusion detection agent may implement such instructed modifications in the privilege settings.

In step 508, for each application process installed and/or executing on the computing device, it may be determined whether the application has been updated. For example, the source code of the computing device may have been modified at the computing device in response to receiving an application update or in response to an administrative user modifying the source code. Once it has been determined that an application process has been updated, the method 500 may proceed to step 509 to transmit a message to a remote server indicating such an update. If the application process has not been updated, the method 500 may proceed to step 511 to determine if an application process's validity period has expired. Applications that are installed on the computing device may be periodically monitored to determine whether they have been updated. Additionally or alternatively, applications may send a message to the intrusion detection agent once they have been updated.

Referring to FIG. 5B, in step 509 a message indicating an application process's update may be transmitted to the remote server. Such an application message may be transmitted in order to receive updated hash functions and authentication codes to validate the updated application process. An application update message for each application process may be transmitted to the remote server by the intrusion detection agent as soon as the intrusion detection agent identifies the application update for each application process.

In step 510, updated hash functions and updated authentication codes may be received from the remote server. The remote server may identify different hash functions to use to validate the updated application process. The computing device may also receive an indication of which portion of the updated application's source code to execute the updated hash function on. The computing device may replace the previously used hash function and authentication for the now updated application process with these updated hash function and authentication code. For example, the intrusion detection agent may update an association stored locally between application processes and the corresponding hash functions and authentication codes used to validate them once the updated hash function and authentication code are received for each updated application process. Once the updated hash function and authentication code for each application is received, the method 500 may proceed to step 511 to check the validity of that application.

In step 511, it may be determined whether the validity period of an application process has expired. The intrusion detection agent may set a period of time for each application process after which the application process may require validation check to be performed again. The intrusion detection agent may perform periodic validation on all application processes to ensure that these applications have not become corrupted or are not behaving inappropriately since the last time that they were validated. In making such a determination of whether the validity period of the application process has expired, the intrusion detection agent may use different validation criteria for different process. Applications that have misbehaved in the past by seeking access to interfaces that they were not privileged to access may have a shorter validity period than applications that are in good standing. Applications that access critical hardware interfaces such as the display device, memory units, Ethernet port, etc. and critical software components such as the device BIOS settings may have a shorter validity period because such applications may have an increased chance of being attacked by a malicious user than other processes that request access to less critical hardware interfaces and software components. For example, in detecting the validity of a root user command to control what is displayed on a display device, the intrusion detection agent may check to see if the root user process has been validated within the last 60 seconds. However, for another process, the period of validation that meets the validation criteria may be longer, such as 5 minutes. The intrusion detection agent may set such different criteria to different processes based on a risk that the intrusion detection agent may have calculated for each process. Such a risk value may be calculated by analyzing the nature of the process, the level of control the process may have, and by analyzing a history of past operations of the process.

In step 512, an authentication code corresponding to the application process being validated may be retrieved. To verify the validity of the application process (e.g., check the digital signature of the application process), an authentication code may be retrieved to compare against the output of the validation check process. The authentication code may be stored on the computing device or may be received from a remote server. The authentication code may be decrypted using security keys stored in the memory unit of the computing device.

In step 513, a cryptographic hash function may be executed on the process to check its validity. The cryptographic hash function may be received from a remote server that is aware of which cryptographic hash function should be used with a given process. The remote server may be made aware that the process is executing on the computing device and accordingly, the remote server may transmit the appropriate cryptographic hash function to the computing device. Data from the requesting process (e.g., portions of the application process's source code) may be input into the appropriate cryptographic hash function to generate a hash value or message digest output.

In step 514, it may be determined whether the authentication code retrieved in step 512 matches the hash value generated in step 513. If the hash value corresponds to the authentication code, then it may be determined that the process is valid and that the process may be trusted. Other digital signature validation techniques may be employed to check the digital signature of each process to determine whether the process may be trusted. If the requesting process is determined, at step 514, to pass validation, the method may proceed to step 515 to determine if the process is requesting access to a hardware interface. However, if the requesting process is determined to fail validation, then the method may proceed to step 520 to terminate the process and not allow access to the requested hardware interface.

In step 515, the computing device may determine whether the process is attempting to access a hardware interface. The process may be monitored to detect if, during its own operation, the process issues a request to access or executes a subroutine to access a hardware interface. By intercepting such a request made by the process to access the hardware interface, the intrusion detection agent may determine that further validation and privilege checking of the application process may be required to ensure the security of the computing device. The computing device may also determine that the process may request access to the hardware interface by examining the source code of the process. The computing device may continuously keep monitoring the process for such a request and method 500 may proceed to step 516 once it is determined that the process is attempting to access a hardware interface.

In step 516, the computing device may determine whether the process has the privilege to access the hardware interface. The privilege settings may be consulted to determine whether there exists a privilege for the process requesting access to the hardware interface. While such privileges may only be accessible to super root processes, the intrusion detection agent, a kernel level agent with super root access may be able to read these privileges and determine whether to grant the process access to the requested hardware interface. The intrusion detection agent may decrypt the securely encrypted privilege settings stored in a memory unit of the computing device to be able to access them. If the intrusion detection agent determines that the requesting process does not have the privilege to access the requested hardware interface, the method may proceed to step 518 to terminate the requesting process. By terminating processes that make unprivileged attempts to hardware interfaces, risks of security breaches may be significantly minimized.

In step 517, it may be determined again if the validity period of the application process has expired. Upon determining that the application process does have the privilege to access the hardware interface, it may be determined whether the validity period of the application process is still active or whether it has expired. The intrusion detection agent may revalidate certain application processes, including those whose validity periods have not yet expired, if such applications are determined to carry a high risk of being corrupted or if the intrusion detection agent determines that there may be a chance that the application process has been corrupted since the last time the process's validity was checked. To check the validity of the process, steps 512, 513, and 514 may be performed and if the process is successfully validated, the method 500 may proceed to step 518 to allow the process with access to the requested hardware interface. If it determined at step 517 that the validity period of the application process has not expired, then the method 500 may proceed to step 518 to allow the process with access to the requested hardware interface.

In step 518, the process may be allowed to access the hardware interface. Once it is determined that the process may be allowed access to the hardware interface, the process may be allowed to communicate with the hardware interface and issue commands to the hardware interface. Such a permission that is granted to the process to access the hardware interface may expire after a predetermined period of time, at which point the method may return to step 517 to check whether the process is valid. Once access to the hardware interface has been completed and the requesting process is finished using the requested hardware interface, the method 500 may proceed to step 508 to determine whether the application process has been updated.

In step 518, the process may be terminated. Once it is determined that the process either does not have the privilege to access the hardware interface or that the process does not meet the validation requirements of the computing device, the process may prevented from accessing the hardware interface. In some embodiments, the process may be terminated to prohibit it from accessing other components of the computing device and/or attempting to breach the computing device's security.

In step 520, a log of the unauthorized attempt by the process to access the hardware interface may be transmitted to remote server. Upon determining that an unauthorized attempt was made, the computing device may log the unauthorized attempt. Such a log may be transmitted to a remote server, which may determine how to treat the process. The remote server may instruct the computing device to isolate the process, modify access privileges to certain hardware interfaces and/or software components, or to delete the process entirely in response to receiving a log identifying the unauthorized attempt. The method 500 may return to step 506 to update the access privileges upon transmitting such a log to the remote server.

Figure 6A:
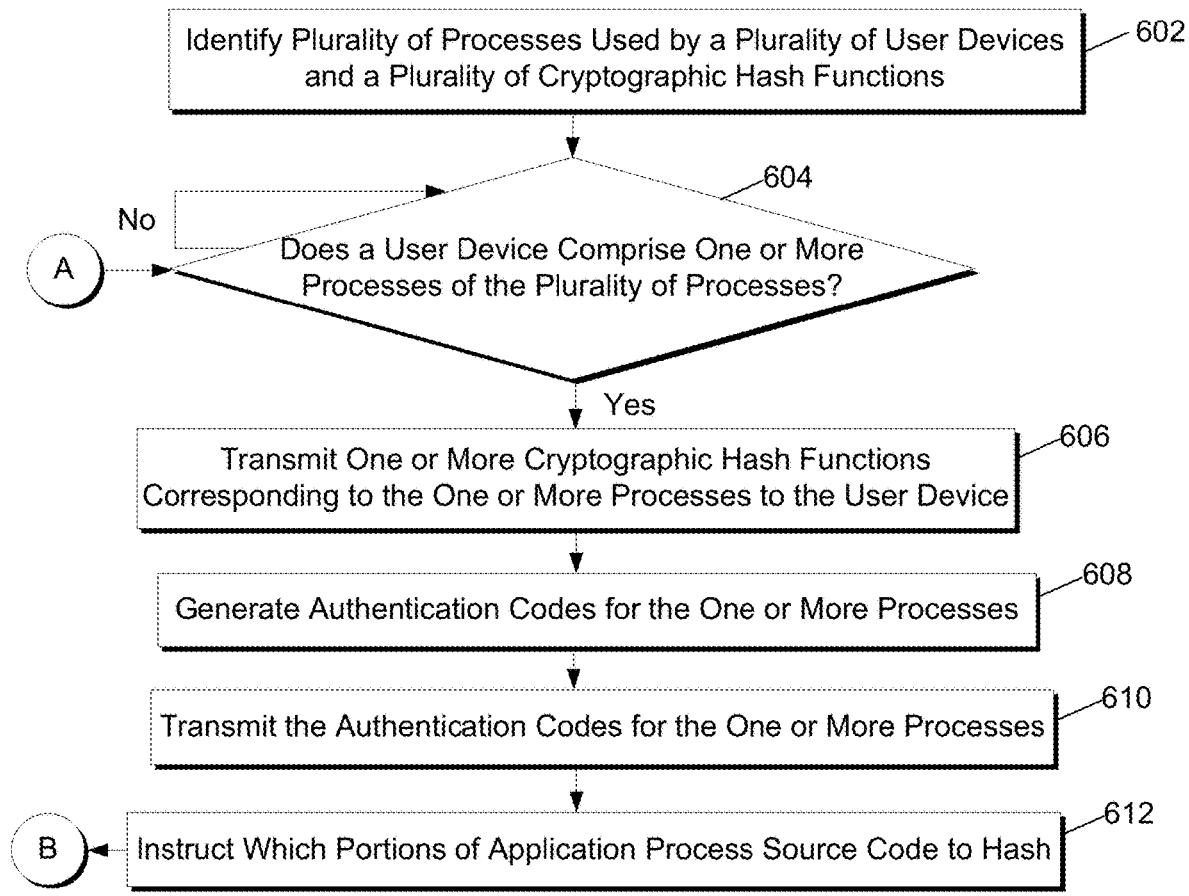
Figure 6B:
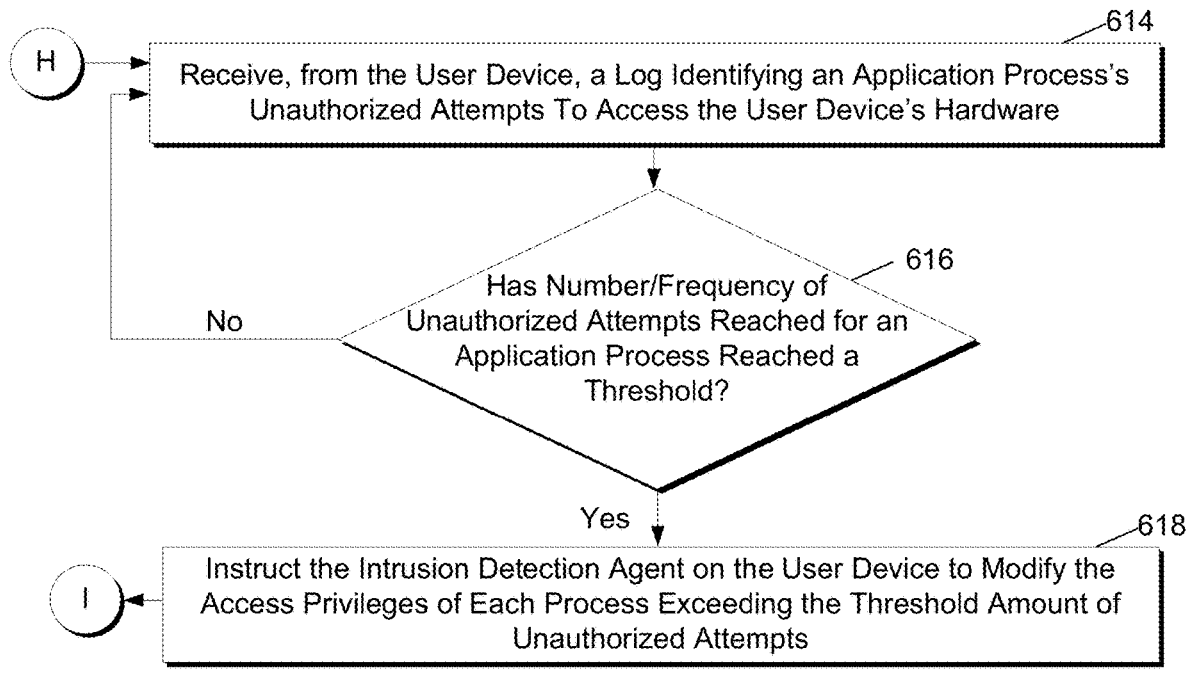
Figure 6C:
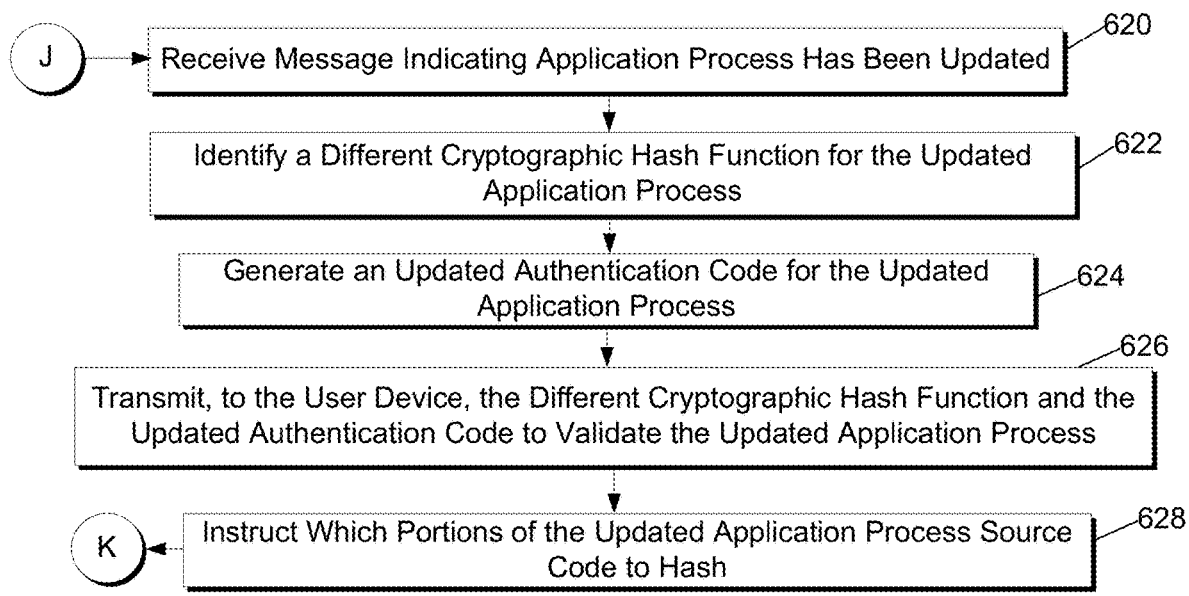

While the steps of method 500 describe monitoring a process's attempt to access hardware interface of the computing device, similar techniques may be performed when a process attempts to access software components of the computing device such as components of the operating system, FIGS. 6A, 6B, and 6C show an example algorithm 600 which may be performed periodically by the various components in the systems shown in FIGS. 1-3. In some embodiments, the steps of algorithm 600 may be performed by a remote server such as server 332 communicating with one or more user devices that perform real-time super root security monitoring. In other embodiments, the steps of algorithm 600 may be performed in part by such a remote server and in part by each of the user devices performing real-time super root security monitoring.

As seen in FIG. 6A, the method 600 may begin at step 602 in which a plurality of processes that are used by a plurality of user device may be identified. A plurality of cryptographic hash functions may also be identified, each of which may be associated with one of the plurality of processes identified. A server such as server 332 of FIG. 3 may have access to applications that execute on the user devices that it communicates with. For example, the server may also receive applications from the same application store as the user devices. The server may also identify an associated cryptographic hash function that may be used to digital sign and validate each application. For example, the server may have access to a database associating each application process to a cryptographic hash function.

In step 604, it may be determined whether a user device comprises one or more processes of the plurality of processes identified in step 602. The server may be able to monitor processes that are being executed on the user devices. For example, each user device may report which processes are executing on it, in a real-time manner, to the server. The server may identify that the user devices, which it communicates with, are executing an application for which the server has a corresponding cryptographic hash function. The server and the user devices may all receive applications from the same source (e.g., an application store). The server may periodically poll each user device to keep track of which applications are executing on each user device. Additionally or alternatively, the server may receive, from the user device, a list of applications that are installed and/or execution on the user device as shown in step 502 of FIG. 5A.

In step 606, one or more cryptographic hash functions corresponding to the one or more process may be transmitted to the user device. Upon determining which applications are executing on each user device, the server may identify a cryptographic hash function corresponding to that user device. A database storing associations between applications and cryptographic hash functions may be consulted in order to identify the corresponding cryptographic hash functions. Alternatively, each cryptographic hash function may specify which application it is intended to validate. Once the cryptographic hash functions corresponding to the applications executing on a user device have been identified, these cryptographic hash functions may be transmitted by to the user device. In order to securely transmit cryptographic hash functions to each user device, the server may initiate secure communication with a kernel level intrusion detection agent executing at the most privileged operating system level of the user device. For example, the server may communicate these cryptographic hash functions to the super root level monitor executing on a user device. The cryptographic hash functions may be encoded such that they are accessible only by kernel agents with super root level access on the user device.

In step 608, the intrusion detection agent may generate an authentication code for each process of the one or more application process identified in steps 602 and 604. The server may execute the one or more cryptographic hash functions on their corresponding processes to generate a hash value for each of the corresponding processes. The server may execute the hash functions on corresponding processes that are trusted to not be corrupted. By performing an initial hash function operation on the application process at the server, the authentication code that is generated may be guaranteed to be free of corruption and may be used to check subsequent hash function results at each user device using the corresponding application process.

In step 610, the authentication codes for the one or more processes may be transmitted to different computing devices. Each authentication code generated in step 608 for each of the one more processes identified in steps 602 and 604 may be transmitted to the user devices using their corresponding applications processes. Such authentication codes may be encrypted using an encryption key that may be available to the user devices. Each authentication code may be encrypted differently based on which destination user device it is being transmitted to.

In step 612, the server may instruct which portions of each of the one or more application processes' source code is to be used to perform a hash function on. The server may indicate which portion of the source code may have been used to perform the initial hash function operation on each application process to generate authentication code so that when subsequent iterations of the hash function are performed on each application process at different computing devices, the same portion of the application source code may be hashed to generate hash codes that may correspond to the authentication code if the process has not been corrupted. User devices may receive such hash codes, authentication codes, and an indication of which portion of the source code to use to hash the application process as described in step 504 of FIG. 5A.

In step 614, as shown in FIG. 6B, a log identifying unauthorized attempts to access the user device's hardware may be received from the user device. Each user device may monitor which of its processes are attempting unauthorized access to hardware interfaces and software components of the user device. By periodically validating each application process and checking their privileges to access the hardware and/or software components that these processes are requesting to access, each user device may identify processes that either do not have the privilege to access the requested components they are requesting or do not pass the requirements of their validation criteria. Each of these conditions results in the user device determining that a process has attempted to access an unauthorized component of the user device. Each user device may compile a log of such unauthorized attempts. The log may identify, for each unauthorized attempt, the process that was attempting such unauthorized access, the time of the requested access, and the hardware interface and/or software component that the process was requesting access to. Such a log may be transmitted to the server as described in step 522 of FIG. 5A. The server, which may receive multiple logs from the user devices that it communicates with, may compile such unauthorized access attempt information across the multiple user devices to determine which processes may be security threats or subject to security breaches.

In step 616, it may be determined whether a preset threshold number and/or frequency of unauthorized attempts have been reached for an application process. By monitoring incoming logs from different user devices, the server may identify which processes are performing unauthorized attempts to access unprivileged hardware interface and may track the number and/or frequency of such unauthorized attempts. The server may have access to a preset number and/or frequency threshold of such unauthorized attempts before an action must be taken. If the server determines that such a threshold has been crossed, the method may proceed to step 618. However, if such a threshold is not crossed, the server may return to step 614 to continue to receive incoming logs of unauthorized attempts.

In step 618, the intrusion detection agent on the user device may be instructed to modify the access privileges of each process exceeding the threshold amount of unauthorized attempts determined in step 616. The access privileges for such process may be modified to prevent these application processes associated with the unauthorized attempts from accessing the user device's hardware by modifying the privileges to access each hardware interface that may be set at each user device as described in step 506 of FIG. 5A. The remote server may also determine that one or more processes on a user device should be terminated based on the information collected from the logs from one or more user devices. For example, once the server has determined that an application process at either one or more of its user devices is subject to security breaches and has been attempting to access unauthorized resources, the server may instruct the one or more user devices, on which such an application process is executing, to terminate the application process. The server may communicate such a termination instruction to the super root level intrusion detection agent on each device. The intrusion detection agent may have complete administrative control over each process and may be able to terminate the application process immediately. Alternatively, the intrusion detection agent may suspend the process and isolate it from the rest of the user device.

In step 620, as shown in FIG. 6C, a message may be received at the server indicating that an application process has been updated. For example, applications executing on each user device may receive updates and be modified as a result of such application updates. The user device may either receive such an update from the server or may receive such an application update from a separate application source such as an application store. Either the remote server or the user device itself may determine that one or more processes executing on the user device has been updated. Once such an update is made to the user device's application and its related processes, the user device may transmit a message indicating such an update to the server, as described in step 509 of FIG. 5B.

In step 622, a different cryptographic hash function to validate the modified process may be identified. In response to determining that a process executing on the user device has been modified, the server may determine that the cryptographic hash function previously used to validate the process would no longer be appropriate to validate the updated function. For example, the server may determine that by inputting the modified process using the previously used cryptographic hash function, the hash value that would be output would no longer correspond to the authentication value stored on the user device. Accordingly, the server may identify a new cryptographic hash value for validating the modified process such that the output hash value would correspond to the authentication code stored in the user device.

In step 624, an updated authentication code may be generated for the updated application process. To generate an updated authentication code for the updated process, the server may execute the different cryptographic hash function identified in step 622 on the updated application process to generate a hash value for the updated application process. The server may execute the hash functions on the updated processes that are trusted to not be corrupted. By performing an initial hash function operation on the updated application process at the server, the authentication code that is generated may be guaranteed to be free of corruption and may be used to check subsequent hash function results at each user device using the corresponding updated application process.

In step 626, the server may transmit the different cryptographic hash function and the updated authentication code to each user device that has updated the application process so that they may validate the updated application process. The server may transmit such a cryptographic hash function and authentication code to the super root level intrusion detection agent on each user device. The server may also update the database storing associations between application processes and cryptographic hash functions and authentication codes to note the change in cryptographic hash function and authentication code for the modified process.

In step 628, the server may instruct which portions of each of the updated application processes' source code, binary code, and/or an executable code is to be used to perform the different hash function on. The server may indicate which portion of the updated application process's source code may have been used to perform the initial hash function operation the updated application process to generate the updated authentication code so that when subsequent iterations of the different hash function are performed on the updated application process, the same portion of the updated application source code may be hashed to generate hash codes that may correspond to the updated authentication code if the updated application process has not been corrupted at the user device. User devices may receive such updated hash codes, authentication codes, and an indication of which portion of the updated application's source code, binary code, and/or an executable code to use to hash the updated application process as described in step 510 of FIG. 5B.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A method comprising:
   storing, in encrypted memory of a computing device, one or more privileges, for a process, associated with the process accessing one or more resources of the computing device;
   based on the process attempting to access a first resource of the one or more resources of the computing device, determining, via the encrypted memory and based on the stored one or more privileges, that the process is privileged to access the first resource; and
   allowing, based on the determining that the process is privileged, the process to access the first resource.

2. The method of claim 1, wherein:
   the process is associated with a root level kernel of an operating system of the computing device, and
   the determining and the allowing are performed by a super root level kernel, of the operating system, that is inaccessible to the root level kernel.

3. The method of claim 1, wherein the one or more resources of the computing device comprise one or more of: a central processor, a video processor, a security processor, a memory or memory region, a file system, an audio/video output, a USB port, an Ethernet port, an antenna, a cable input, a wireless receiver, a serial port, an external memory unit, a high definition media interface, a ZigBee interface, an optical interface, an SATA interface, a key ladder, a memory-to-memory decryptor, a timer, a memory controller, a device driver, a kernel level operating system call, or a BIOS setting.

4. The method of claim 1, wherein the encrypted memory comprises a memory of a security processor.

5. The method of claim 1, further comprising:
   detecting, for a hardware interface, a source of an incoming data packet; and
   determining, via the encrypted memory, whether the source is privileged to access the hardware interface.

6. The method of claim 1, further comprising:
   based on a second process attempting to access a second resource of the one or more resources of the computing device, determining, via the encrypted memory, that the second process is not privileged to access the second resource; and
   preventing, based on the determining that the second process is not privileged, the second process from accessing the second resource.

7. The method of claim 1, further comprising:
   determining, based on a validation check performed after expiration of a validity period associated with the process, that the process is valid.

8. The method of claim 1, further comprising:
   determining, for the process, a validity period based on one or more of: a behavior of the process, the one or more privileges for the process, or a risk of malicious attack via the process.

9. The method of claim 1, further comprising:
   detecting a triggering event comprising one or more of: an attempt to modify a privilege, an external instruction to modify or read a memory location, or an attempt to add code to a memory location; and
   based on the detected triggering event, causing one or more of: reporting of a security breach to a remote server, displaying of a message indicating detected malicious activity, terminating a code fragment, terminating all application processes executing on the computing device, or rebooting of the computing device.

10. The method of claim 1, wherein the determining and the allowing are performed by a super root level kernel of an operating system of the computing device, the method further comprising:
    monitoring, by the super root level kernel, operations executing on each component of the computing device.

11. The method of claim 1, wherein the determining and the allowing are performed by a super root level kernel of an operating system of the computing device, the method further comprising:
    determining, by the super root level kernel and for each process attempting to access a resource of the one or more resources of the computing device, whether the attempting process is privileged to access the resource.

12. The method of claim 1, wherein the determining and the allowing are performed by a super root level kernel of an operating system of the computing device, the method further comprising:
    preventing modification of the one or more privileges by processes other than the super root level kernel.

13. A method comprising:
    determining one or more privileges, for a process, associated with the process accessing one or more resources of a computing device;
    determining, by a super root level kernel of an operating system of the computing device and based on the process attempting to access a first resource of the one or more resources of the computing device, that the process is privileged to access the first resource, wherein the process is associated with a root level kernel of the operating system, and wherein the super root level kernel is inaccessible to the root level kernel; and
    allowing, based on the determining that the process is privileged, the process to access the first resource.

14. The method of claim 13, wherein the one or more resources of the computing device comprise one or more of: a central processor, a video processor, a security processor, a memory or memory region, a file system, an audio/video output, a USB port, an Ethernet port, an antenna, a cable input, a wireless receiver, a serial port, an external memory unit, a high definition media interface, a ZigBee interface, an optical interface, an SATA interface, a key ladder, a memory-to-memory decryptor, a timer, a memory controller, a device driver, a kernel level operating system call, or a BIOS setting.

15. The method of claim 13, further comprising:
    based on a second process attempting to access a second resource of the one or more resources of the computing device, determining, via an encrypted memory, that the second process is not privileged to access the second resource; and
    preventing, based on the determining that the second process is not privileged, the second process from accessing the second resource.

16. The method of claim 13, further comprising:
    determining, based on a validation check performed after expiration of a validity period associated with the process, that the process is valid.

17. The method of claim 13, further comprising:
    determining, for the process, a validity period based on one or more of: a behavior of the process, the one or more privileges for the process, or a risk of malicious attack via the process.

18. The method of claim 13, further comprising:
   detecting a triggering event comprising one or more of: an attempt to modify a privilege, an external instruction to modify or read a memory location, or an attempt to add code to a memory location; and
   based on the detected triggering event, causing one or more of: reporting of a security breach to a remote server, displaying of a message indicating detected malicious activity, terminating a code fragment, terminating all application processes executing on the computing device, or rebooting of the computing device.

19. The method of claim 13, wherein the allowing is performed by the super root level kernel of the operating system, the method further comprising:
   monitoring, by the super root level kernel, operations executing on each component of the computing device.

20. The method of claim 13, wherein the allowing is performed by the super root level kernel of the operating system, the method further comprising:
   determining, by the super root level kernel and for each process attempting to access a resource of the one or more resources of the computing device, whether the attempting process is privileged to access the resource.

21. The method of claim 13, wherein the allowing is performed by the super root level kernel of the operating system, the method further comprising:
   preventing modification of the one or more privileges by processes other than the super root level kernel.

22. A method comprising:
   determining, for each process of a plurality of processes:
      a validity period specific to the process; and
      one or more privileges, for the process, associated with the process accessing one or more resources of a computing device;
   based on a determination that a first process, of the plurality of processes, is attempting to access a first resource of the one or more resources of the computing device, determining whether the first process is privileged to access the first resource based on the one or more privileges determined for the first process;
   determining, based on a validation check performed after expiration of the determined validity period associated with the first process, whether the first process is valid;
   based on a determination that the first process is privileged to access the first resource and that the first process is valid, determining authorization of the first process to access the first resource; and
   allowing, based on the determined authorization, the first process to access the first resource.

23. The method of claim 22, further comprising:
   storing, in an encrypted memory of the computing device, the one or more privileges determined for each process of the plurality of processes,
   wherein the determining whether the first process is privileged to access the first resource comprises determining, via the encrypted memory, whether the first process is privileged to access the first resource.

24. The method of claim 22, wherein:
   the determining whether the first process is privileged to access the first resource comprises determining, by a super root level kernel of an operating system of the computing device, whether the first process is privileged to access the first resource,
   the first process is associated with a root level kernel of the operating system, and
   the super root level kernel is inaccessible to the root level kernel.

25. The method of claim 22, wherein the one or more resources of the computing device comprise one or more of: a central processor, a video processor, a security processor, a memory or memory region, a file system, an audio/video output, a USB port, an Ethernet port, an antenna, a cable input, a wireless receiver, a serial port, an external memory unit, a high definition media interface, a ZigBee interface, an optical interface, an SATA interface, a key ladder, a memory-to-memory decryptor, a timer, a memory controller, a device driver, a kernel level operating system call, or a BIOS setting.

26. A computing device comprising:
   one or more processors; and
   memory storing instructions that, when executed by the one or more processors, configure the computing device to:
      store, in encrypted memory of the computing device, one or more privileges, for a process, associated with the process accessing one or more resources of the computing device;
      based on the process attempting to access a first resource of the one or more resources of the computing device, determine, via the encrypted memory and based on the stored one or more privileges, that the process is privileged to access the first resource; and
      allow, based on determining that the process is privileged, the process to access the first resource.

27. The computing device of claim 26, wherein the process is associated with a root level kernel of an operating system of the computing device, wherein a super root level kernel of the operating system is inaccessible to the root level kernel, and wherein the instructions, when executed by the one or more processors, configure the computing device to:
   determine that the process is privileged to access the first resource by determining, by the super root level kernel, that the process is privileged; and
   allow the process to access the first resource by allowing, by the super root level kernel, the process to access the first resource.

28. The computing device of claim 26, wherein the one or more resources of the computing device comprise one or more of: a central processor, a video processor, a security processor, a memory or memory region, a file system, an audio/video output, a USB port, an Ethernet port, an antenna, a cable input, a wireless receiver, a serial port, an external memory unit, a high definition media interface, a ZigBee interface, an optical interface, an SATA interface, a key ladder, a memory-to-memory decryptor, a timer, a memory controller, a device driver, a kernel level operating system call, or a BIOS setting.

29. The computing device of claim 26, wherein the encrypted memory comprises a memory of a security processor.

30. The computing device of claim 26, wherein the instructions, when executed by the one or more processors, configure the computing device to:
   detect, for a hardware interface, a source of an incoming data packet; and
   determine, via the encrypted memory, whether the source is privileged to access the hardware interface.

31. The computing device of claim 26, wherein the instructions, when executed by the one or more processors, configure the computing device to:
   based on a second process attempting to access a second resource of the one or more resources of the computing device, determine, via the encrypted memory, that the second process is not privileged to access the second resource; and prevent, based on determining that the second process is not privileged, the second process from accessing the second resource.

32. The computing device of claim 26, wherein the instructions, when executed by the one or more processors, configure the computing device to:
determine, based on a validation check performed after expiration of a validity period associated with the process, that the process is valid.

33. The computing device of claim 26, wherein the instructions, when executed by the one or more processors, configure the computing device to:
determine, for the process, a validity period based on one or more of: a behavior of the process, the one or more privileges for the process, or a risk of malicious attack via the process.

34. The computing device of claim 26, wherein the instructions, when executed by the one or more processors, configure the computing device to:
detect a triggering event comprising one or more of: an attempt to modify a privilege, an external instruction to modify or read a memory location, or an attempt to add code to a memory location; and
based on the detected triggering event, cause one or more of: reporting of a security breach to a remote server, displaying of a message indicating detected malicious activity, terminating a code fragment, terminating all application processes executing on the computing device, or rebooting of the computing device.

35. The computing device of claim 26, wherein the instructions, when executed by the one or more processors, configure the computing device to:
determine that the process is privileged to access the first resource by determining, by a super root level kernel of an operating system of the computing device, that the process is privileged;
allow the process to access the first resource by allowing, by the super root level kernel, the process to access the first resource; and
monitor, by the super root level kernel, operations executing on each component of the computing device.

36. The computing device of claim 26, wherein the instructions, when executed by the one or more processors, configure the computing device to:
determine that the process is privileged to access the first resource by determining, by a super root level kernel of an operating system of the computing device, that the process is privileged;
allow the process to access the first resource by allowing, by the super root level kernel, the process to access the first resource; and
determine, by the super root level kernel and for each process attempting to access a resource of the one or more resources of the computing device, whether the attempting process is privileged to access the resource.

37. The computing device of claim 26, wherein the instructions, when executed by the one or more processors, configure the computing device to:
determine that the process is privileged to access the first resource by determining, by a super root level kernel of an operating system of the computing device, that the process is privileged;

allow the process to access the first resource by allowing, by the super root level kernel, the process to access the first resource; and
prevent modification of the one or more privileges by processes other than the super root level kernel.

38. A computing device comprising:
one or more processors; and
memory storing instructions that, when executed by the one or more processors, configure the computing device to:
determine, for each process of a plurality of processes:
a validity period specific to the process; and
one or more privileges, for the process, associated with the process accessing one or more resources of the computing device;
based on a determination that a first process, of the plurality of processes, is attempting to access a first resource of the one or more resources of the computing device, determine whether the first process is privileged to access the first resource based on the one or more privileges determined for the first process;
determine, based on a validation check performed after expiration of the determined validity period associated with the first process, whether the first process is valid;
based on a determination that the first process is privileged to access the first resource and that the first process is valid, determine authorization of the first process to access the first resource; and
allow, based on the determined authorization, the first process to access the first resource.

39. The computing device of claim 38, wherein the instructions, when executed by the one or more processors, configure the computing device to:
store, in an encrypted memory of the computing device, the one or more privileges determined for each process of the plurality of processes; and
determine whether the first process is privileged to access the first resource by determining, via the encrypted memory, whether the first process is privileged to access the first resource.

40. The computing device of claim 38, wherein the first process is associated with a root level kernel of an operating system of the computing device, wherein a super root level kernel of the operating system is inaccessible to the root level kernel, and wherein the instructions, when executed by the one or more processors, configure the computing device to:
determine whether the first process is privileged to access the first resource by determining, by the super root level kernel, whether the first process is privileged to access the first resource.

41. The computing device of claim 38, wherein the one or more resources of the computing device comprise one or more of: a central processor, a video processor, a security processor, a memory or memory region, a file system, an audio/video output, a USB port, an Ethernet port, an antenna, a cable input, a wireless receiver, a serial port, an external memory unit, a high definition media interface, a ZigBee interface, an optical interface, an SATA interface, a key ladder, a memory-to-memory decryptor, a timer, a memory controller, a device driver, a kernel level operating system call, or a BIOS setting.

42. A non-transitory computer-readable medium storing instructions that, when executed, configure a computing device to:

store, in encrypted memory of the computing device, one or more privileges, for a process, associated with the process accessing one or more resources of the computing device;

based on the process attempting to access a first resource of the one or more resources of the computing device, determine, via the encrypted memory and based on the stored one or more privileges, that the process is privileged to access the first resource; and allow, based on determining that the process is privileged, the process to access the first resource.

43. The non-transitory computer-readable medium of claim 42, wherein the process is associated with a root level kernel of an operating system of the computing device, wherein a super root level kernel of the operating system is inaccessible to the root level kernel, and wherein the instructions, when executed, configure the computing device to:

determine that the process is privileged to access the first resource by determining, by the super root level kernel, that the process is privileged; and allow the process to access the first resource by allowing, by the super root level kernel, the process to access the first resource.

44. The non-transitory computer-readable medium of claim 42, wherein the one or more resources of the computing device comprise one or more of: a central processor, a video processor, a security processor, a memory or memory region, a file system, an audio/video output, a USB port, an Ethernet port, an antenna, a cable input, a wireless receiver, a serial port, an external memory unit, a high definition media interface, a ZigBee interface, an optical interface, an SATA interface, a key ladder, a memory-to-memory decryptor, a timer, a memory controller, a device driver, a kernel level operating system call, or a BIOS setting.

45. The non-transitory computer-readable medium of claim 42, wherein the encrypted memory comprises a memory of a security processor.

46. The non-transitory computer-readable medium of claim 42, wherein the instructions, when executed, configure the computing device to:

detect, for a hardware interface, a source of an incoming data packet; and determine, via the encrypted memory, whether the source is privileged to access the hardware interface.

47. The non-transitory computer-readable medium of claim 42, wherein the instructions, when executed, configure the computing device to:

based on a second process attempting to access a second resource of the one or more resources of the computing device, determine, via the encrypted memory, that the second process is not privileged to access the second resource; and prevent, based on determining that the second process is not privileged, the second process from accessing the second resource.

48. The non-transitory computer-readable medium of claim 42, wherein the instructions, when executed, configure the computing device to:

determine, based on a validation check performed after expiration of a validity period associated with the process, that the process is valid.

49. The non-transitory computer-readable medium of claim 42, wherein the instructions, when executed, configure the computing device to:

determine, for the process, a validity period based on one or more of: a behavior of the process, the one or more privileges for the process, or a risk of malicious attack via the process.

50. The non-transitory computer-readable medium of claim 42, wherein the instructions, when executed, configure the computing device to:

detect a triggering event comprising one or more of: an attempt to modify a privilege, an external instruction to modify or read a memory location, or an attempt to add code to a memory location; and based on the detected triggering event, cause one or more of: reporting of a security breach to a remote server, displaying of a message indicating detected malicious activity, terminating a code fragment, terminating all application processes executing on the computing device, or rebooting of the computing device.

51. The non-transitory computer-readable medium of claim 42, wherein the instructions, when executed, configure the computing device to:

determine that the process is privileged to access the first resource by determining, by a super root level kernel of an operating system of the computing device, that the process is privileged;

allow the process to access the first resource by allowing, by the super root level kernel, the process to access the first resource; and monitor, by the super root level kernel, operations executing on each component of the computing device.

52. The non-transitory computer-readable medium of claim 42, wherein the instructions, when executed, configure the computing device to:

determine that the process is privileged to access the first resource by determining, by a super root level kernel of an operating system of the computing device, that the process is privileged;

allow the process to access the first resource by allowing, by the super root level kernel, the process to access the first resource; and determine, by the super root level kernel and for each process attempting to access a resource of the one or more resources of the computing device, whether the attempting process is privileged to access the resource.

53. The non-transitory computer-readable medium of claim 42, wherein the instructions, when executed, configure the computing device to:

determine that the process is privileged to access the first resource by determining, by a super root level kernel of an operating system of the computing device, that the process is privileged;

allow the process to access the first resource by allowing, by the super root level kernel, the process to access the first resource; and prevent modification of the one or more privileges by processes other than the super root level kernel.

54. A non-transitory computer-readable medium storing instructions that, when executed, configure a computing device to:

determine, for each process of a plurality of processes:
a validity period specific to the process; and
one or more privileges, for the process, associated with the process accessing one or more resources of the computing device;

based on a determination that a first process, of the plurality of processes, is attempting to access a first resource of the one or more resources of the computing device, determine whether the first process is privileged to access the first resource based on the one or more privileges determined for the first process;

determine, based on a validation check performed after expiration of the determined validity period associated with the first process, whether the first process is valid;

based on a determination that the first process is privileged to access the first resource and that the first process is valid, determine authorization of the first process to access the first resource; and allow, based on the determined authorization, the first process to access the first resource.

55. The non-transitory computer-readable medium of claim 54, wherein the instructions, when executed, configure the computing device to:

store, in an encrypted memory of the computing device, the one or more privileges determined for each process of the plurality of processes; and determine whether the first process is privileged to access the first resource by determining, via the encrypted memory, whether the first process is privileged to access the first resource.

56. The non-transitory computer-readable medium of claim 54, wherein the first process is associated with a root level kernel of an operating system of the computing device, wherein a super root level kernel of the operating system is inaccessible to the root level kernel, and wherein the instructions, when executed, configure the computing device to:

determine whether the first process is privileged to access the first resource by determining, by the super root level kernel, whether the first process is privileged to access the first resource.

57. The non-transitory computer-readable medium of claim 54, wherein the one or more resources of the computing device comprise one or more of: a central processor, a video processor, a security processor, a memory or memory region, a file system, an audio/video output, a USB port, an Ethernet port, an antenna, a cable input, a wireless receiver, a serial port, an external memory unit, a high definition media interface, a ZigBee interface, an optical interface, an SATA interface, a key ladder, a memory-to-memory decryptor, a timer, a memory controller, a device driver, a kernel level operating system call, or a BIOS setting.

* * * * *